US012637837B2

(12) United States Patent
Dockter et al.

(10) Patent No.: US 12,637,837 B2
(45) Date of Patent: May 26, 2026

(54) WORK MACHINES HAVING A SUSPENDED OPERATOR STATION

(71) Applicant: Vermeer Manufacturing Company, Pella, IA (US)

(72) Inventors: Nathan Dockter, Pella, IA (US); Mason Prieksat, Pella, IA (US); Stephen Daining, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 526 days.

(21) Appl. No.: 18/040,326

(22) PCT Filed: Aug. 3, 2021

(86) PCT No.: PCT/US2021/044393
    § 371 (c)(1),
    (2) Date: Feb. 2, 2023

(87) PCT Pub. No.: WO2022/031738
    PCT Pub. Date: Feb. 10, 2022

(65) Prior Publication Data
    US 2023/0295897 A1    Sep. 21, 2023

Related U.S. Application Data

(60) Provisional application No. 63/185,069, filed on May 6, 2021, provisional application No. 63/060,847, filed on Aug. 4, 2020.

(51) Int. Cl.
    *E02F 9/16*      (2006.01)
    *B62D 51/02*     (2006.01)
    (Continued)

(52) U.S. Cl.
    CPC .............. *E02F 9/166* (2013.01); *B62D 51/02* (2013.01); *E02F 3/3414* (2013.01); *B62D 33/0604* (2013.01)

(58) Field of Classification Search
    CPC   B62D 33/06; B62D 33/0604; B62D 33/0608; B62D 37/04; B62D 51/02;
    (Continued)

(56) References Cited

U.S. PATENT DOCUMENTS 5,579,859 A * 12/1996 Quellhorst ......... B62D 33/0604
                                                248/638
5,967,597 A * 10/1999 Vander Kooi ..... B62D 33/0604
                                                296/190.07
(Continued)

FOREIGN PATENT DOCUMENTS

DE    102009058598 A1 *  6/2011  .............. B66F 9/065
DE    102018110059 A1    10/2019
(Continued)

OTHER PUBLICATIONS

ASV, TR-25 Compact Track Loader, "Built Small to Do Big Work", https://www.asvi.com/compact-track-loaders/rt-25/, available before Aug. 4, 2020, 5 pages.
(Continued)

*Primary Examiner* — Amy R Weisberg
*Assistant Examiner* — Denise Lynne Esquivel
(74) *Attorney, Agent, or Firm* — Armstrong Teasdale LLP

(57)                ABSTRACT

Work machines having an operator platform for standing operation of the work machine are disclosed. The work machines include a suspension system for suspending an operator station that includes an operator platform and a control station from a chassis of the work machine.

19 Claims, 28 Drawing Sheets

(51) Int. Cl.
  *E02F 3/34*          (2006.01)
  *B62D 33/06*        (2006.01)

(58) Field of Classification Search
  CPC .. B62D 55/00; E02F 9/166; E02F 9/16; E02F 9/163; E02F 3/3414; A01D 34/82; A01D 34/64
  USPC ............... 296/190.07, 190.01; 280/124.134, 280/124.135; 180/316, 324, 331, 334, 180/305–308
  See application file for complete search history.

(56)          References Cited

U.S. PATENT DOCUMENTS

| | | | |
|---|---|---|---|
| 6,206,121 B1 | 3/2001 | Michel | |
| 6,327,839 B1 | 12/2001 | Velke et al. | |
| 6,431,302 B2 | 8/2002 | Patmont et al. | |
| 6,488,291 B1 | 12/2002 | Bellis | |
| 6,490,849 B1 | 12/2002 | Scag et al. | |
| 6,516,596 B2 | 2/2003 | Velke et al. | |
| 6,782,964 B1 | 8/2004 | Korthals et al. | |
| 6,830,111 B2 | 12/2004 | Page | |
| 7,086,214 B2 | 8/2006 | Thompson et al. | |
| 7,549,500 B2 | 6/2009 | Graham et al. | |
| 7,611,155 B2 | 11/2009 | Bares | |
| 8,141,886 B1 | 3/2012 | Sugden et al. | |
| 8,186,475 B2 | 5/2012 | Sugden et al. | |
| 8,262,104 B2 | 9/2012 | Kallevig et al. | |
| 8,528,915 B2 | 9/2013 | Kallevig | |
| 8,561,382 B2 | 10/2013 | Gamble et al. | |
| 9,066,468 B2 | 6/2015 | Zweig et al. | |
| 9,238,902 B2 | 1/2016 | Meinders et al. | |
| 9,321,386 B1 | 4/2016 | Thomas et al. | |
| 9,409,589 B2 | 8/2016 | Oswald et al. | |
| 9,982,413 B2 | 5/2018 | Paolini et al. | |
| 10,091,936 B2 | 10/2018 | Laurin et al. | |
| 10,194,582 B2 | 2/2019 | Kline et al. | |
| 10,472,783 B2 | 11/2019 | Rich | |
| 10,582,652 B2 | 3/2020 | Douglas et al. | |
| 10,718,098 B1 | 7/2020 | Hager et al. | |
| 11,712,984 B2 * | 8/2023 | Stover ...................... | B60N 2/24 296/190.07 |
| 2006/0285960 A1 * | 12/2006 | Hitchcock ............... | B66F 9/145 414/664 |
| 2007/0062075 A1 | 3/2007 | Graham et al. | |
| 2013/0153320 A1 * | 6/2013 | Contratto ............... | B60N 2/502 297/217.3 |
| 2016/0152262 A1 * | 6/2016 | Laurin ...................... | B60T 7/12 56/11.8 |
| 2019/0141889 A1 | 5/2019 | Fisher et al. | |
| 2019/0166758 A1 | 6/2019 | Phillip et al. | |
| 2020/0062321 A1 | 2/2020 | Redinger et al. | |
| 2020/0239291 A1 * | 7/2020 | Lohmann ........... | B62D 33/0604 |
| 2020/0283991 A1 * | 9/2020 | Krieger .................. | E02F 3/433 |

FOREIGN PATENT DOCUMENTS

| | | |
|---|---|---|
| EP | 1731477 A2 | 12/2006 |
| EP | 1205427 A1 | 5/2022 |
| FR | 2898100 A1 | 9/2007 |
| FR | 2954303 A1 | 6/2011 |

OTHER PUBLICATIONS

Ferris Stand-On Commercial Zero Turn Mower: SRS™ Z2, https://www.ferrismowers.com/na/en_us/support/videos/browse/ferris-stand-on-commercial-zero-turn-mower-srs-z2.html, available before Aug. 4, 2020.

Wright Commercial Mowers, Stander ZK: Suspension Platform, https://www.youtube.com/watch?v=pYHmLE_SBxo, Available before Aug. 4, 2020.

Ditch Witch SK15550 Mini Skid Steer Operator's Manual, Yanmar 3TNV86C, Issue No. 2.0/OM-1/20, Part No. 053-2996, The Charles Machine Works, Inc., 2017, 2018, 2020.

* cited by examiner

725

754

742

WORK MACHINES HAVING A SUSPENDED OPERATOR STATION

CROSS-REFERENCE TO RELATED APPLICATIONS

This patent application is the 35 U.S.C. § 371 national stage of International Patent Application No. PCT/US2021/044393, filed Aug. 3, 2021, which claims the benefit of U.S. Provisional Patent Application No. 63/060,847, filed Aug. 4, 2020, and U.S. Provisional Patent Application No. 63/185,069, filed May 6, 2021. Each of the above listed applications are incorporated herein by reference in their entirety.

FIELD OF THE DISCLOSURE

The field of the disclosure relates to work machines that have an operator platform for standing operation of the work machine.

BACKGROUND

Work machines such as compact utility loaders and some mowers may be operated from a standing position in which the operator stands on a platform. The work machine includes hand controls that are positioned at a control station positioned near where the hands of the operator may be located when standing on the platform (e.g., at least about 90 cm or from about 90 cm to about 130 cm from the operator platform as measured from the highest hand control). Example hand controls include controls for propelling the work machine forward and backward, for steering the machine and/or for operating a work tool connected to the machine. The control station may include a hand grip bar which an operator grasps to steady himself or herself on the machine (e.g., while gripping controls with the other hand). An example hand grip bar is shown and described in U.S. Pat. No. 7,549,500, which is incorporated herein by reference for all relevant and consistent purposes.

Work machines often travel over uneven terrain which causes the machine to suddenly move up or down. For example, as the machine travels over a bump or other obstacle as shown in FIG. 1, vertical movement of the machine translates to the operator which may cause the operator to feel discomfort and/or to become fatigued. Operation of the work tool (e.g., loading and unloading material from a loader bucket) may also result in shock and vibrations which fatigues the operator. Further, vibrations may be felt by an operator at all speeds of the machine which makes it difficult to mitigate operator fatigue.

A need exists for work machines that are able to cushion the ride of an operator and that allow the operator controls to move with the operator when the operator platform moves relative to the chassis of the machine to reduce operator fatigue.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a work machine. The work machine includes a chassis and a ground-engaging drive mechanism. The work machine includes an operator station. The operator station includes an operator standing platform and a control station. The control station has one or more hand controls for propelling the work machine forward. The work machine includes a suspension system that connects the control station to the chassis.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
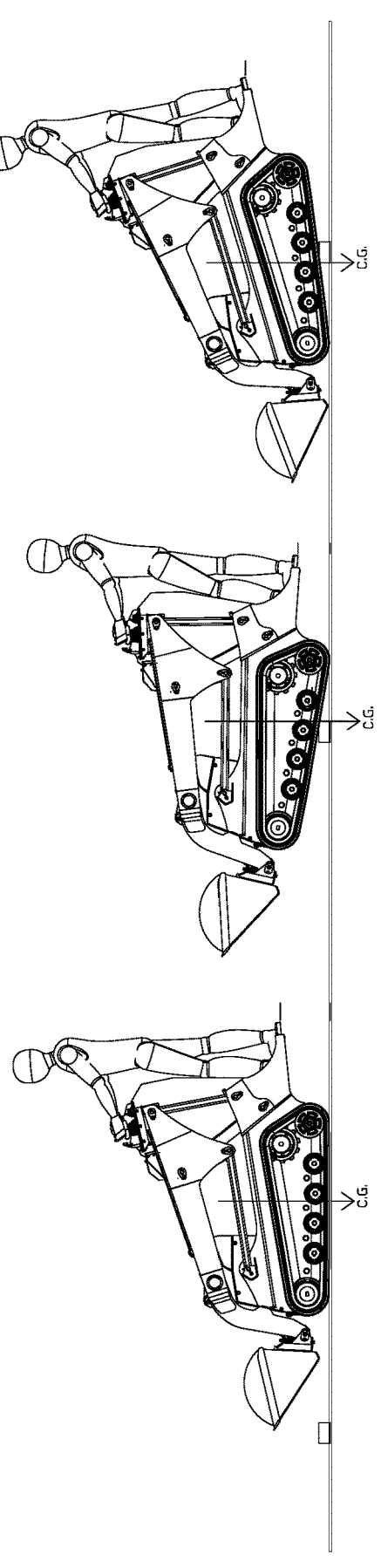
FIG. 1 is a side view of a conventional work machine as it travels over an object or rise in terrain.
Figure 2:
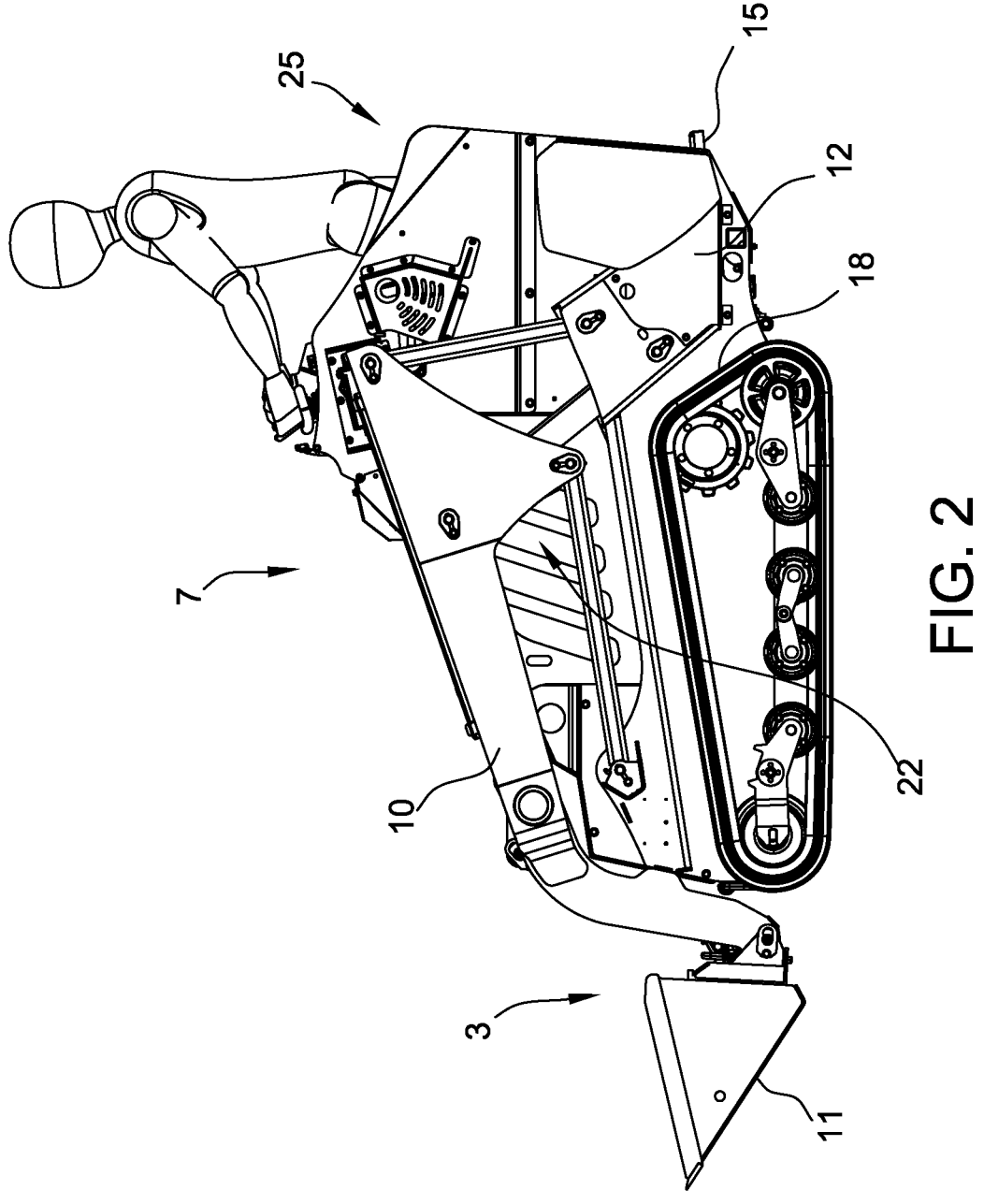
FIG. 2 is a side view of a work machine in which the work machine is a loader apparatus.

An embodiment of a work machine is generally referred to as "7" in FIG. 2. The work machine 7 may generally be any machine in which an operator stands on an operator standing platform 15 during operation of the machine (e.g., to operate the controls to propel the machine forward and/or to operate a work tool of the machine 7). The work machine 7 is shown as a loader apparatus in FIGS. 2-4 and as a mower in FIG. 15. The work machine 7 includes a front 13 (FIG. 3) and a rear 17 and a longitudinal axis A that extends between the front 13 and rear 17.

Figure 15:
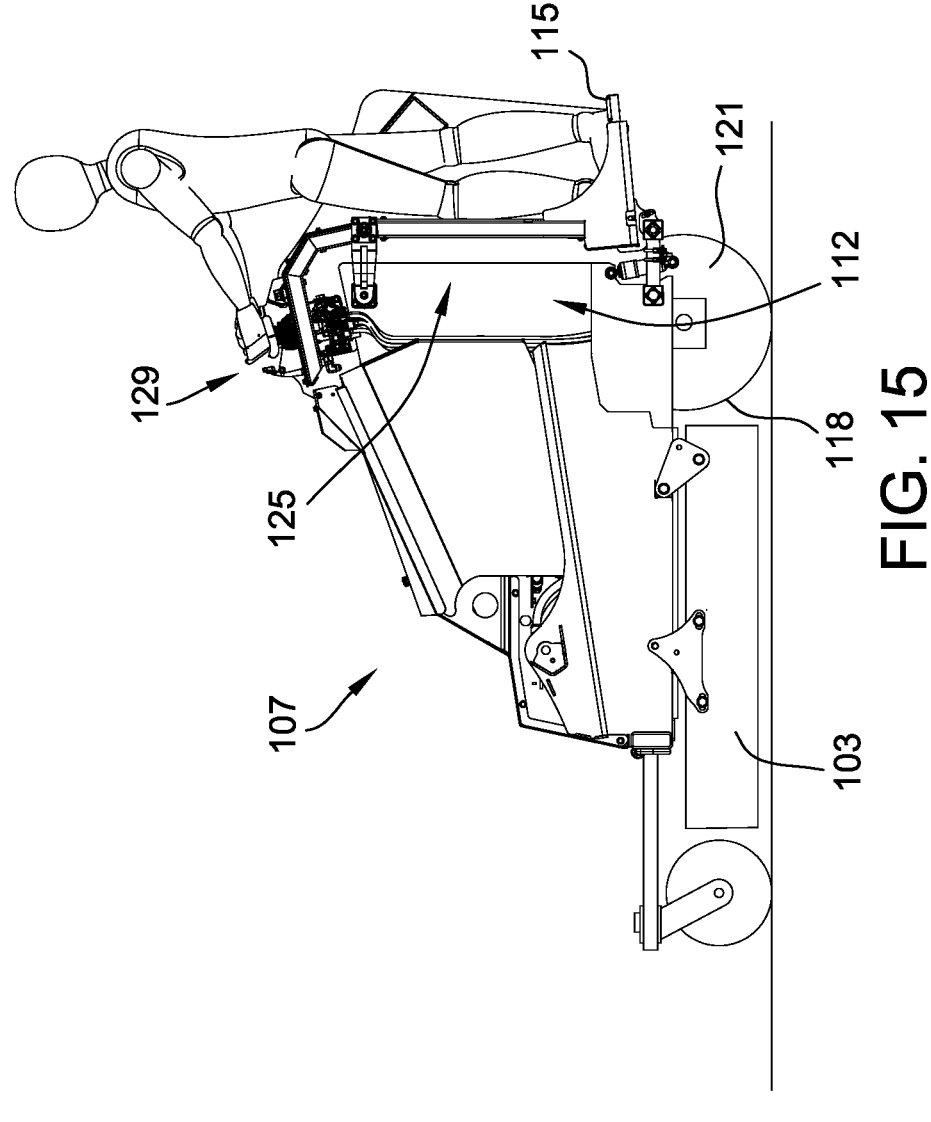
FIG. 15 is a side view of another embodiment of the work machine in which the work machine is shown as a mower.

The work machine 7 includes a chassis 12 (e.g., frame, subframe, or multi-part frame). The operator standing platform 15 (or simply "standing platform" or even "platform") is mounted to the chassis 12 (e.g., the platform is fully supported by the chassis 12 and does not have one or more separate wheels mounted to the platform such as with a "sulky" or "dolly" type operator platform). The work machine 7 includes a work tool 3 that is supported by the chassis 12. In the illustrated embodiment, the work tool 3 is a loader bucket 11 attached to a loader 10 that is connected to the chassis 12. Other tools (e.g., interchangeable tools) include augers, forks, stump grinders, tillers, rollers or the like may be connected to the loader 10. The work tool 3 may also be a mower deck 103 as shown in FIG. 15.

Figure 16:
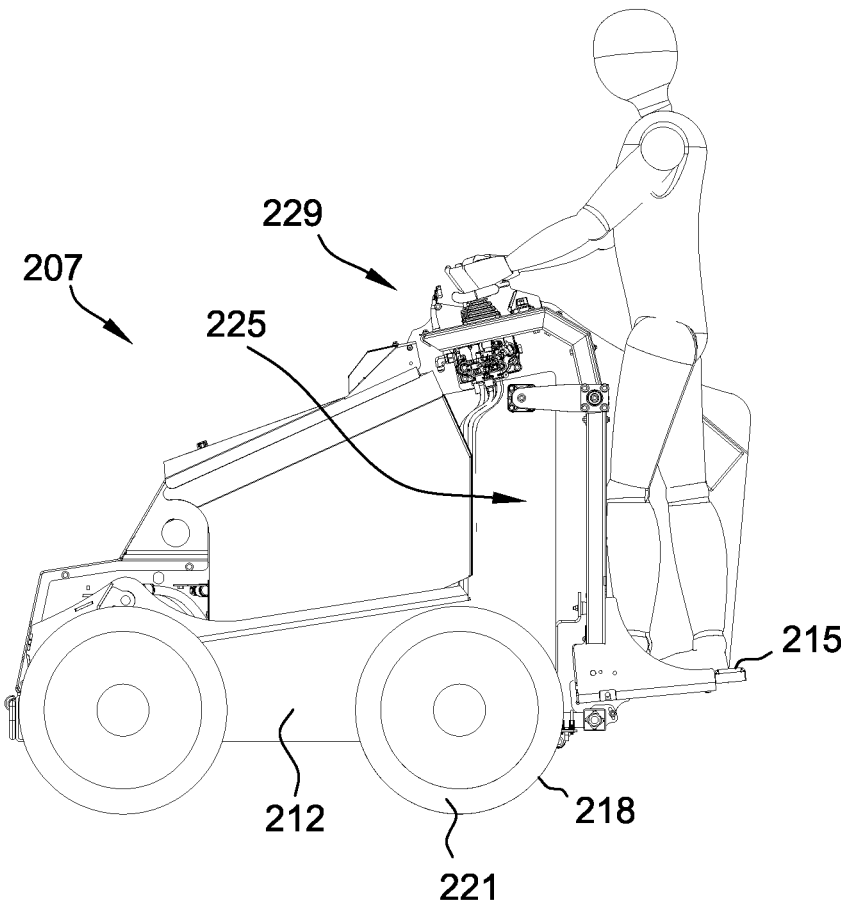
FIG. 16 is an embodiment of the work machine having wheels.

The work machine 7 includes a ground-engaging drive mechanism 18 connected to the chassis 12. As shown, the drive mechanism 18 includes tracks 20. In other embodiments such as the mower 107 shown in FIG. 15 and the loader vehicle 207 shown in FIG. 16, the drive mechanism 118, 218 includes wheels 121, 221. The drive mechanism 18 is driven by an engine 22 (i.e., the machine 7 is self-propelled).

Figure 5:
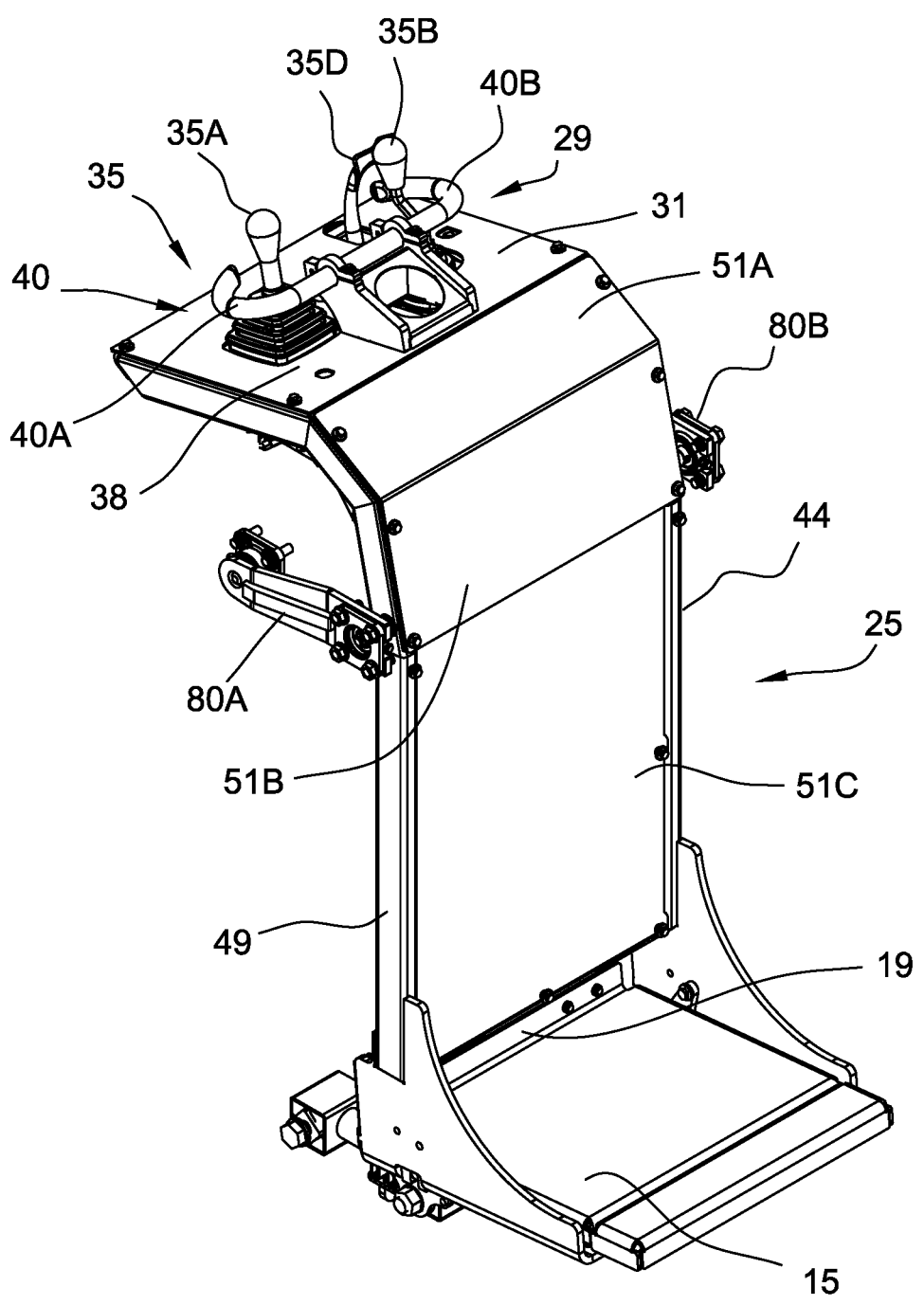
FIG. 5 is a perspective view of the operator station.

The machine 7 includes an operator station 25 that is suspended from the chassis 12 by a suspension system 54 (FIG. 6) (i.e., a system that cushions shock and/or dissipates vibrations by one or more suspension elements that connect the operator station 25 to the chassis 12). The operator station 25 includes the operator standing platform 15 (FIG. 5). The operator station 25 also includes a control station 29 that includes one or more controls 35 for operating the work machine 7. The control station 29, as part of the operator station 25, is suspended from the chassis 12.

The control station 29 includes a control station panel 31 and one or more hand controls 35 disposed on the control station panel 31 (e.g., that extend upward from the panel 31). In the illustrated embodiment, the hand controls 35 include a direction and speed control 35A (shown as a joystick) for propelling the machine forward and backward and for steering the machine 7. The control station 29 also includes a lift/tilt control 35B for raising and lowering the loader 10 (FIG. 2) and for tilting the work tool (e.g., loader bucket). An auxiliary power control 35C may control power applied to a tool (e.g., auger) and a fluid direction control 35D controls the direction at which hydraulic fluid flows through the tool. The illustrated embodiment of the control station 29 also includes an ignition 38 for starting and stopping the engine 22 (FIG. 2). The controls of the control station 29 of the illustrated embodiment are exemplary and other controls and combination of controls may be used unless stated otherwise. For example, in embodiments in which the work machine 107 is a mower (FIG. 15), the hand controls 35 may include left and right drive system speed controls, a PTO control for powering the mower and/or a control for raising and lowering the mower deck.

The control station 29 may include additional controls disposed on the control panel 31 such as lighting controls, gear selectors, speed controls (e.g., separate speed and steering controls) or the like. The control station 29 may include two or more control panels (e.g., two panels at different heights) with a set of hand controls being disposed on each control panel. The illustrated control station 29 is exemplary and other control arrangements may be used. In embodiments of the present disclosure, at least one hand control such as a control for propelling the machine forward (e.g., direction and speed control) is suspended and moves with the standing platform 15 as described further below.

In the illustrated embodiment, the control station 29 also includes a hand grip bar 40 disposed on the control station panel 31 (e.g., that extends upward from the panel 31). The hand grip bar 40 is generally fixed with respect to the control panel 31. By being fixed (i.e., not moveable), the hand grip bar 40 reduces operator fatigue relative to an operator who grips an operator control 35. In the illustrated embodiment, the hand grip bar 40 includes a left hand grip bar 40A and a right hand grip bar 40B. In accordance with embodiments of the present disclosure, the hand grip bar 40 is suspended and moves with the standing platform 15 as described further below.

The operator station 25 includes a tie member 44. The tie member 44 is connected to the control station panel 31 and the standing platform 15 to connect the control station panel 31 and platform 15 as a unit that moves together. The tie member 44 may be a wall, frame, linkage (described further below), cable, or any structure that ties the control station panel 31 to the standing platform 15.

Figure 6:
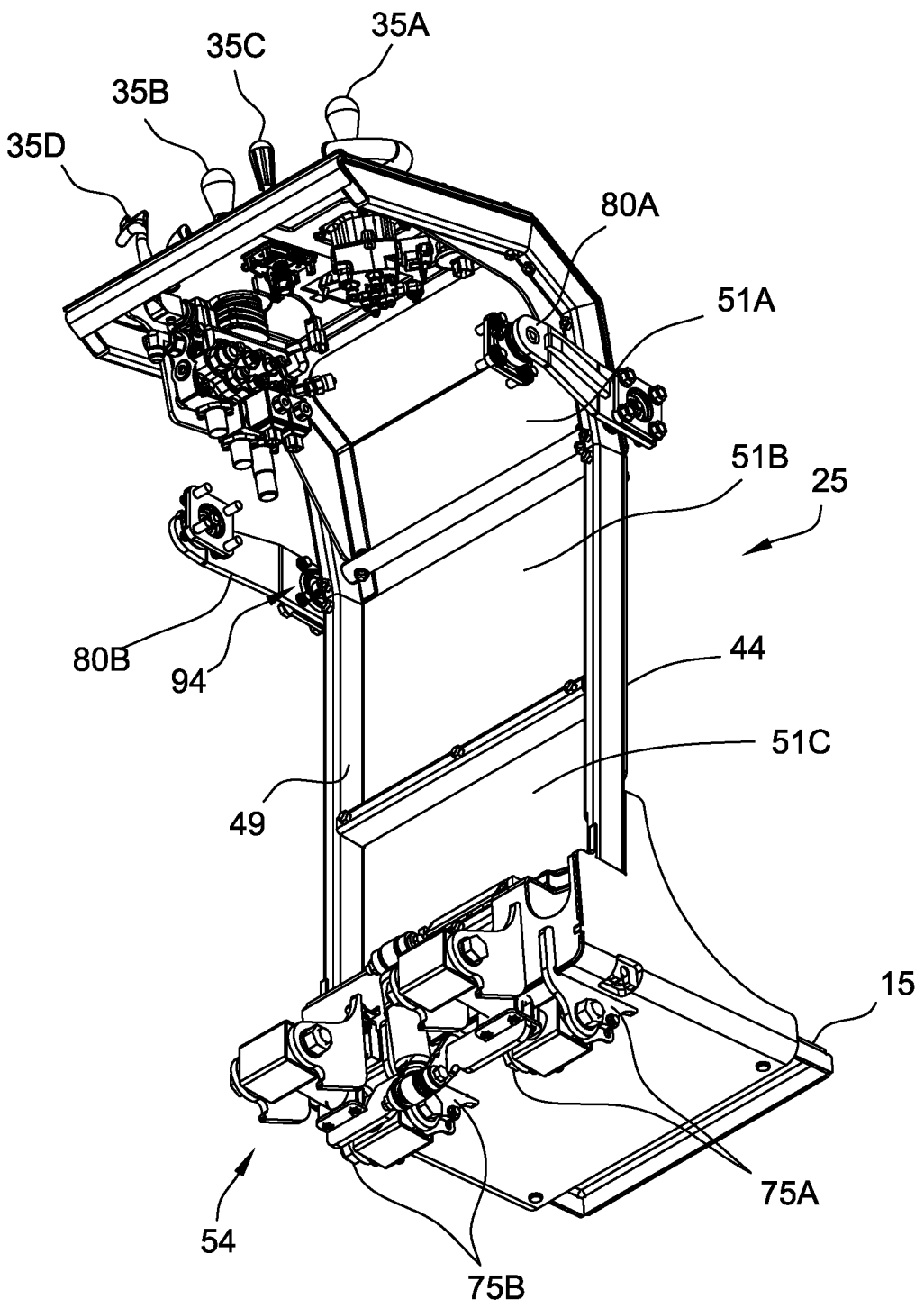
FIG. 6 is another perspective view of the operator station.

Referring now to FIG. 6, the operator station 25 includes an operator station support frame 49. The standing platform 15 and control station panel 31 are each connected to the operator station support frame 49. The tie member 44 includes a portion of the support frame 49 and includes panels 51A, 51B, 51C connected to the support frame 49.

Figure 7:
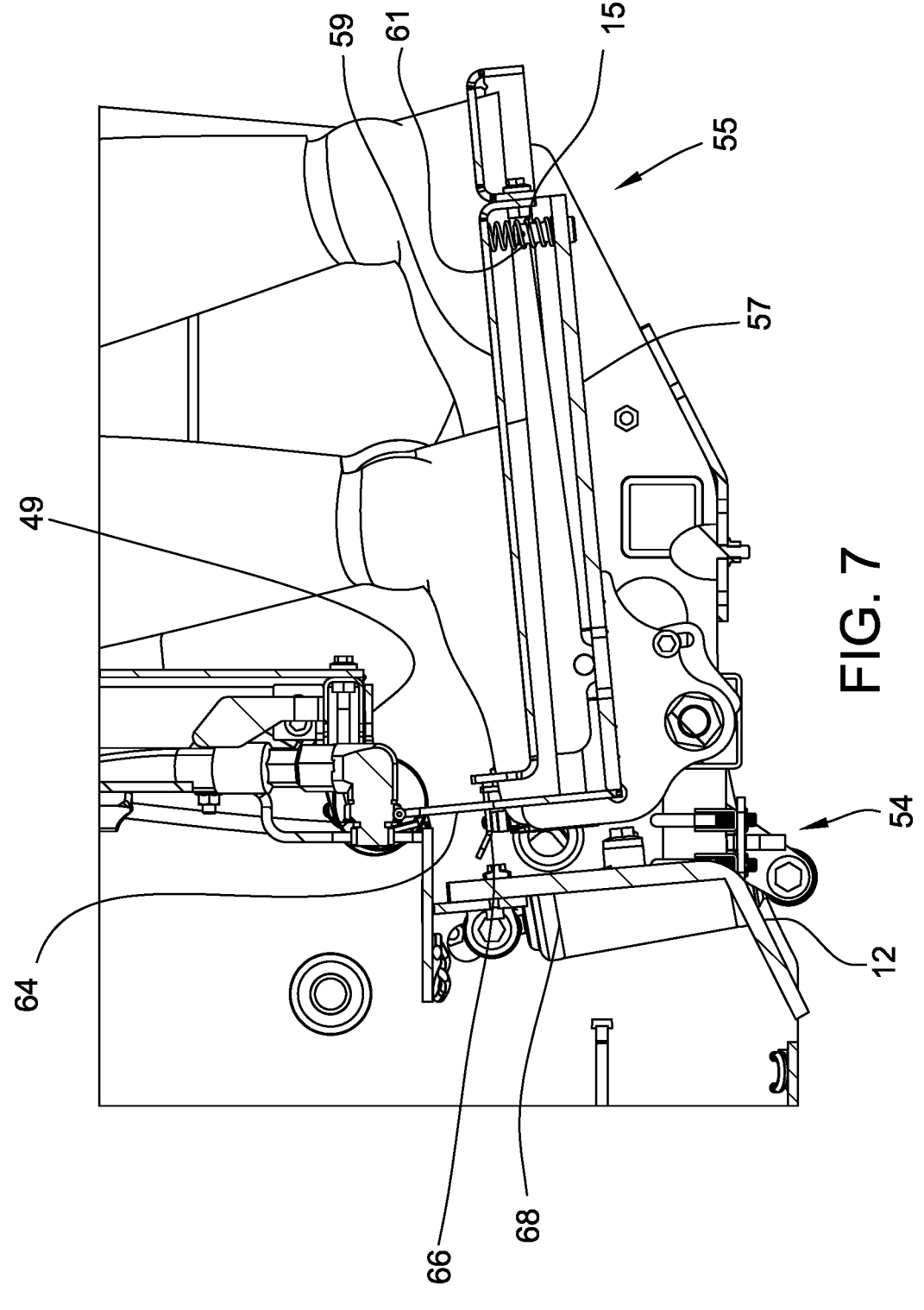
FIG. 7 is a side view of an operator platform of the operator station showing an operator presence system incorporated therein.

In some embodiments of the present disclosure, the work machine 7 incorporates an operator presence system 55 (FIG. 7) such as a system that detects when an operator is positioned on the standing platform 15. The platform 15 may include a subframe 57 and an upper plate 59 that are separated by one or more springs 61. The subframe 57 includes an upright portion 64 which is connected to the operator station support frame 49. When an operator steps on the upper plate 59 of the platform 15, the spring 61 is compressed. A sensor 66 senses movement of the upper plate 59 and sends a signal to a control unit (not shown) indicating presence of an operator on the platform 15. The control unit may disable propulsion of the work machine 7 and/or operation of the work tool 3 when an operator is not sensed by the operator presence system 55. Generally, the components of the operator presence system 55 (i.e., spring 61 and sensor 66) is not considered a portion of the suspension system 54 described below which suspends the operator station 25 (FIG. 5) from the work machine chassis 12 (FIG. 2). The platform 15, spring 61 and sensor 66 move together and are suspended from the chassis 12 together such that the suspension system 54 does not affect sensing of an operator on the platform 15. In other embodiments, an operator presence system may be incorporated into the control station 29 (e.g., by a capacitance sensor disposed on an operator control). In further embodiments, the operator presence system 55 may include one or more proximity sensors (not shown) for detecting the presence of an operator on the platform 15. The proximity sensors may include, for example and without limitation, a Radar sensor and/or a Lidar sensor. In yet further embodiments, the operator presence system may include a strain gage (not shown) having electrically conductive rubber embedded within the strain gage. In yet further embodiments, the operator presence system 55 may include a vibration sensor (not shown) operable to detect a change in vibration of the platform and/or the suspension system 54 when an operator is on the platform 15 compared to when an operator is not on the platform 15.

Figure 14:
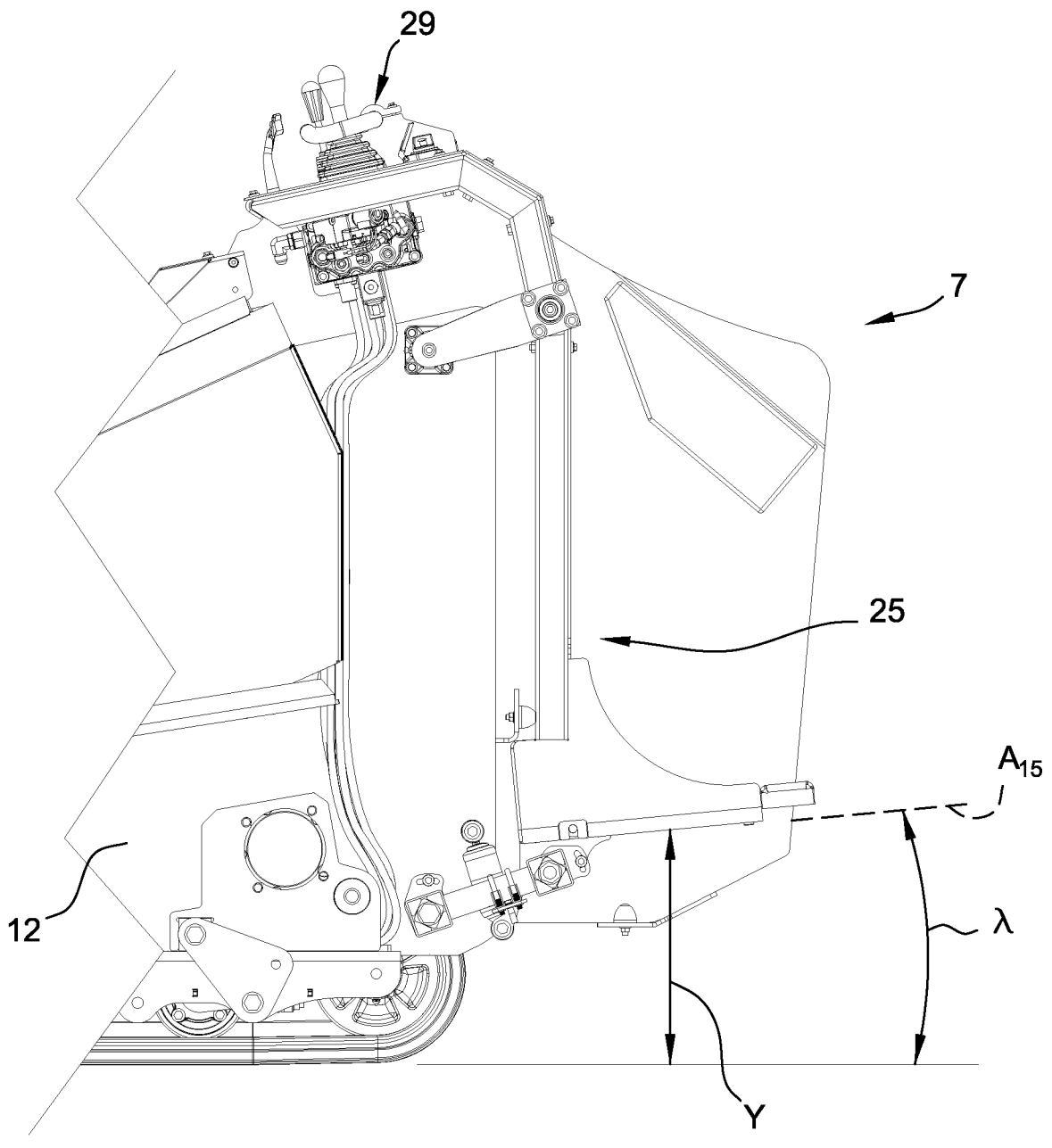
FIG. 14 is a partial side view of the work machine having components removed to show the operator station in a raised position relative to the chassis.

In other embodiments, the operator presence system 55 detects a position and/or orientation of one or more components of the suspension system 54 (e.g., such as the shock absorber 68 and the one or more rubber torsion linkages 73A, 73B) to determine whether an operator is on the platform 15. In particular, in some such embodiments, a suspension sensor (not shown) is provided on the work machine 7 and is operable to detect a position and/or orientation of the one or more components of the suspension system 54. The suspension sensor may include a proximity sensor, a rotary potentiometer, a plunger sensor (similar to the sensor 66), or any other suitable sensor. For example, when the operator is standing on the platform 15, the torsion linkages 73A, 73B may be oriented in the mid-range position, as shown and described with respect to FIG. 12. When the operator is not standing on the platform 15, the torsion linkages 73A, 73B are angled upward from the mid-range position between the chassis 12 and the operator station 25 (e.g., as shown in FIG. 14). Additionally, a position of the shock absorber 68 may change when the operator steps off the platform 15. Thus, in such embodiments, the suspension sensor (not shown) detects at least one of a position and orientation change in the torsion linkages 73A, 73B and/or the shock absorber 68 to determine whether the operator is standing on the platform 15. Moreover, in such embodiments, the control unit (not shown) may be configured with a time delay, such that momentary changes in the position and/or orientation of components of the suspension system 54 (e.g., as a result of the work machine 7 driving over changes in terrain) do not trigger the control unit to disable propulsion of the work machine 7.

Figure 3:
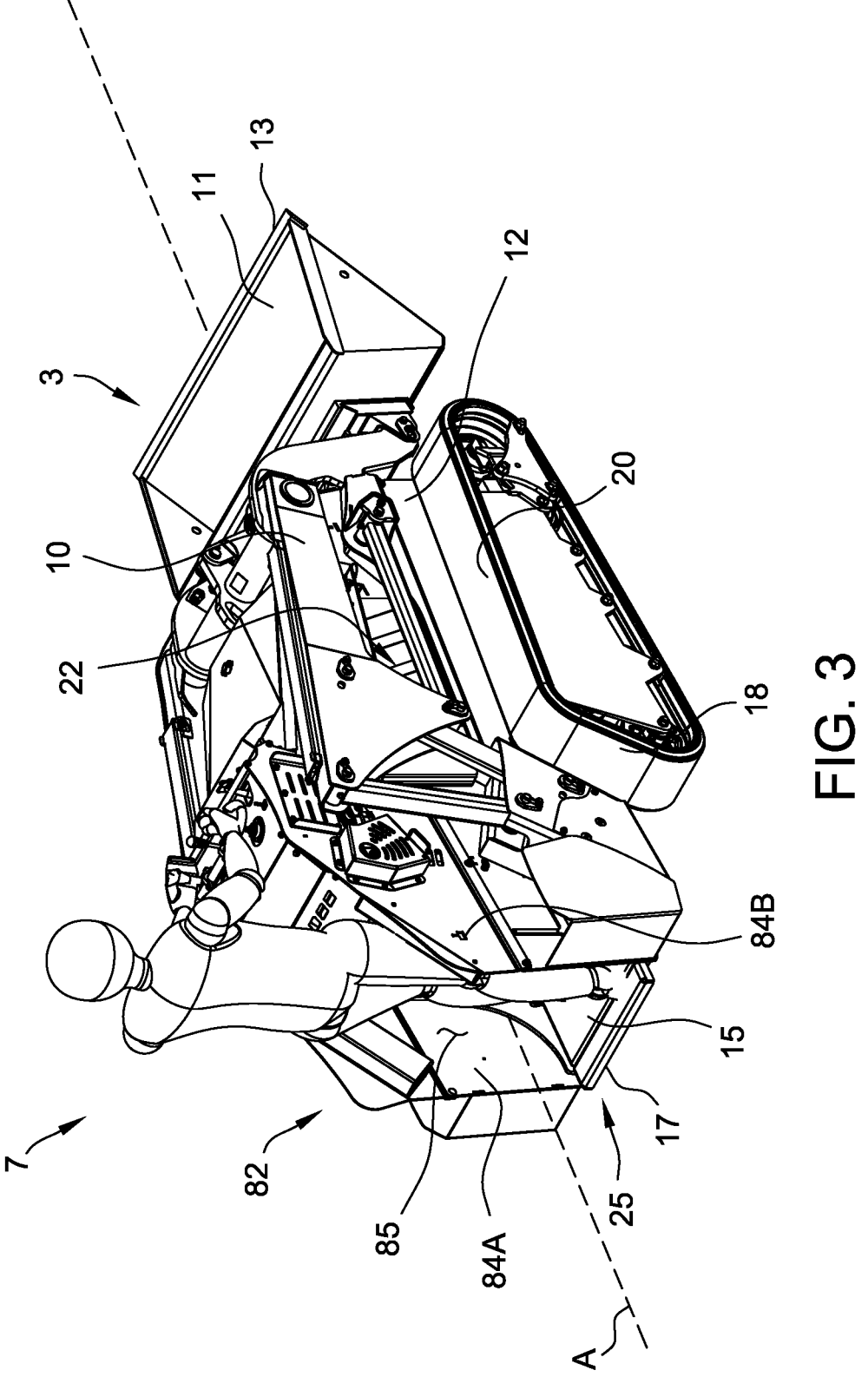
FIG. 3 is a perspective view of the work machine.
Figure 10:
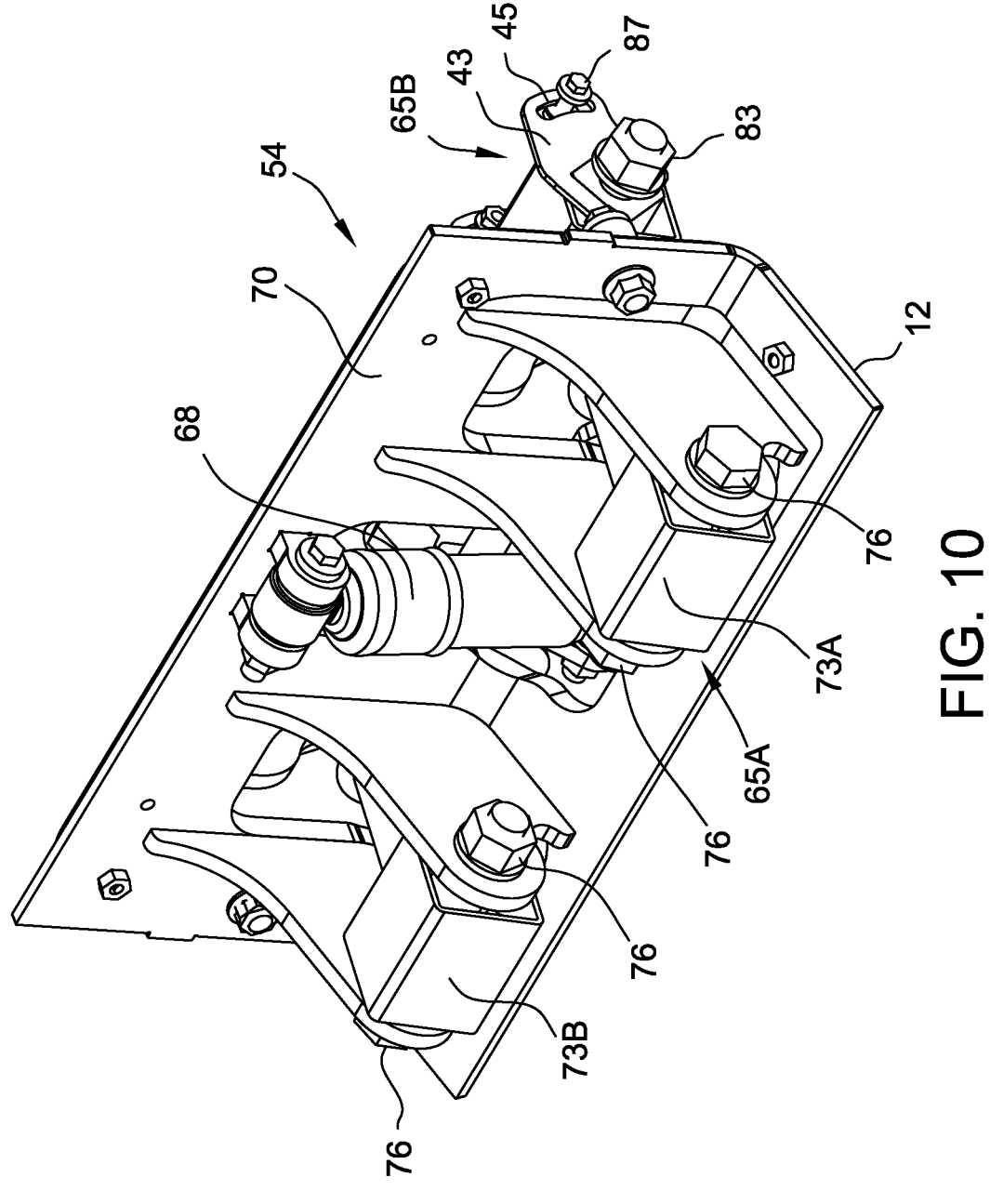
FIG. 10 is a perspective view of a chassis bracket to which a shock absorber and two rubber torsion linkages of the suspension system are connected.

Referring now to FIG. 10, the suspension system 54 connects the operator station 25 to the chassis 12 (FIG. 3). The suspension system 54 includes a shock absorber 68 and one or more rubber torsion linkages 73A, 73B. The shock absorber 68 is pivotally connected to the chassis 12. As shown in FIG. 10, the shock absorber 68 is pivotally connected to a chassis bracket 70 of the chassis 12. The rubber torsion linkages 73A, 73B are connected to the chassis 12 (and, in particular, to the chassis bracket 70) by fasteners 76.

Figure 9:
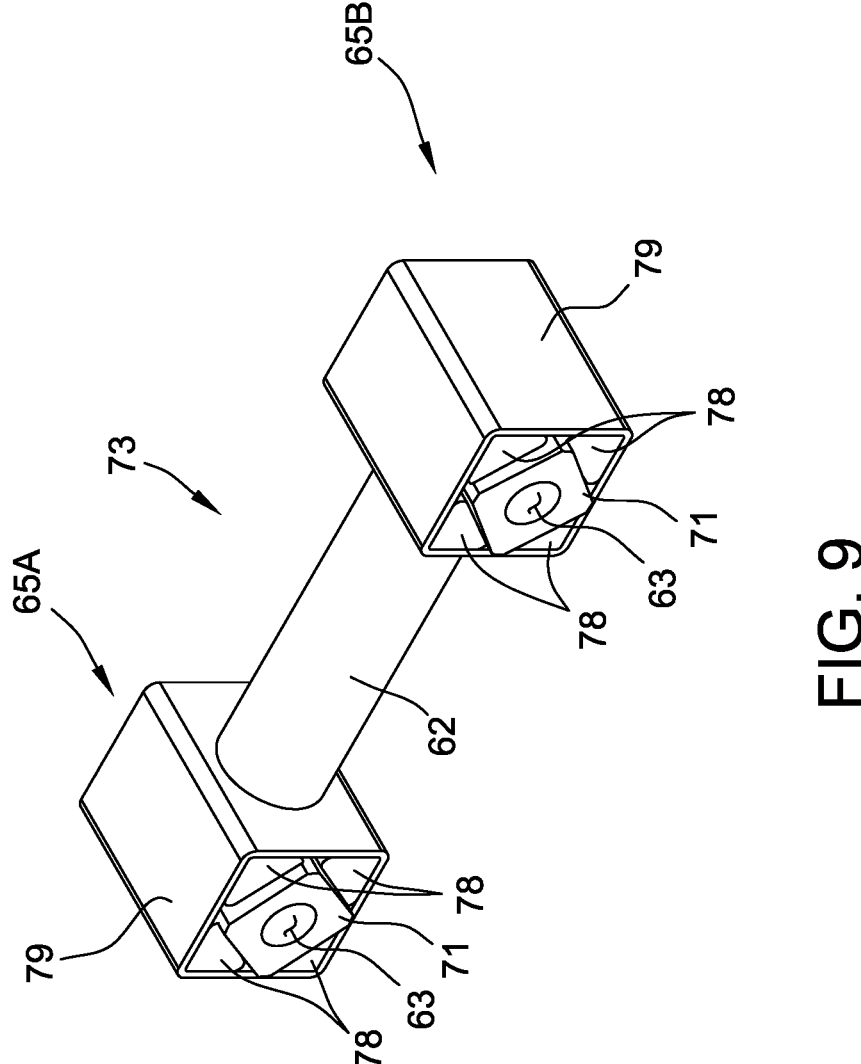
FIG. 9 is a perspective view of a rubber torsion linkage.

Referring now to FIG. 9, the rubber torsion linkage 73 include first and second torsion elements 65A, 65B disposed at each end of the linkage 73 that are connected by a shaft 62. Each torsion element 65A, 65*b* includes an inner bar 71 disposed within an outer tube 79. The inner bar 71 and outer tube 79 are each square in profile and are offset from each other 45°. The inner bar 71 and outer tube 79 are not connected. The inner bar 71 may extend beyond the outer tube 79 (e.g., for connection of an adjustment lever as described below). Four rubber torsion cords 78 are disposed between the inner bar 71 and outer tube 79 at the corners of the outer tube 79. The fasteners 76 (FIG. 10) connect to the inner bar 71 and extend into apertures 63 (e.g., fasteners are fixed to the inner bar 71 to thereby fixedly connect the inner bar 71 to the chassis 12). The rubber-torsion cords 78 flex and allow the outer tube 79 to move an amount relative to the inner bar 71 thereby dissipating energy such as vibrational energy to improve operator ride.

Figure 8:
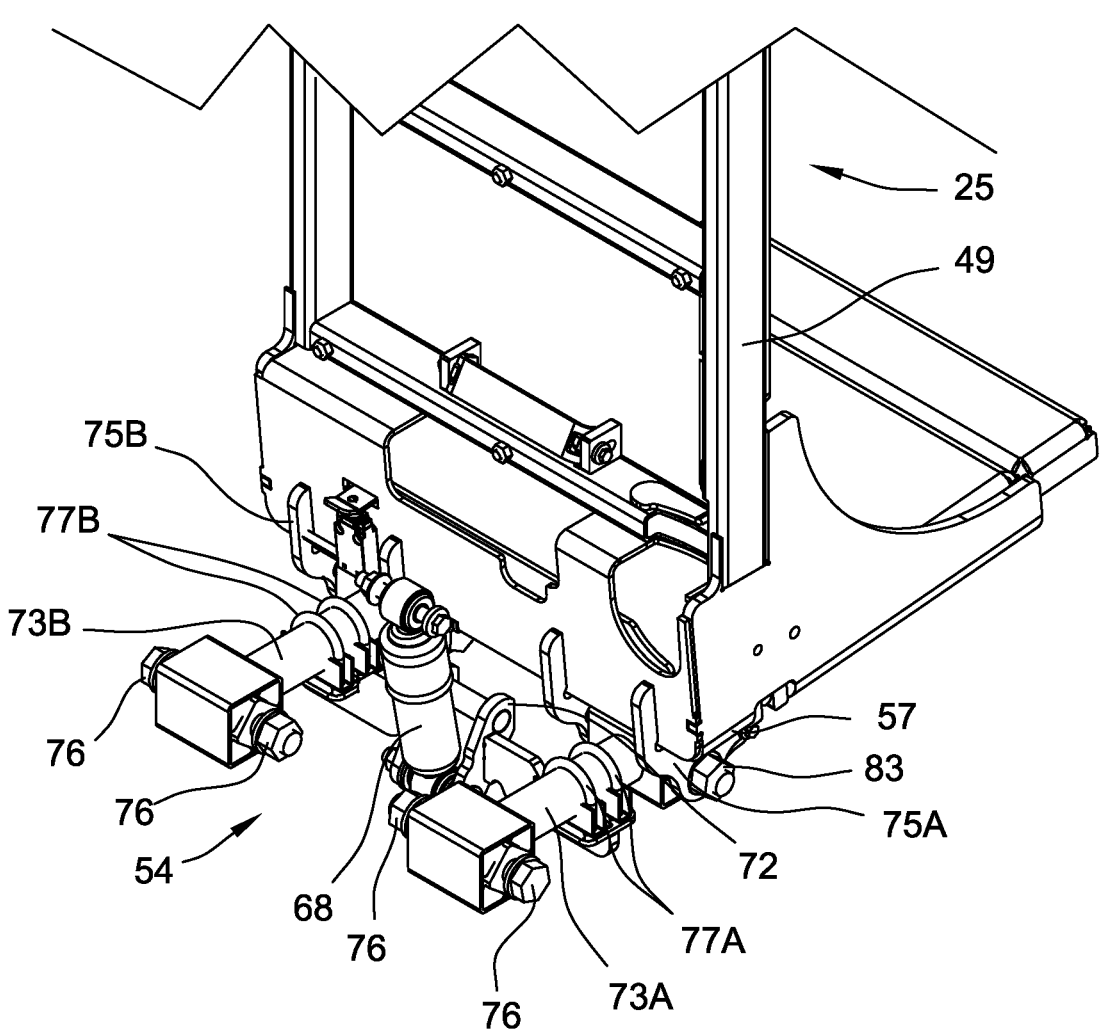
FIG. 8 is a perspective view of the operator platform and a suspension system from which the operator station is suspended.

The rubber torsion linkages 73A, 73B are connected to the operator station 25 by fasteners 83 and, in particular, to first and second bracket assemblies 75A, 75B (FIG. 8) that are connected to the bottom plate 57 of the operator platform 15 (and, indirectly, to the operator station support frame 49). The shock absorber 68 is pivotally connected to a support bracket 72. The support bracket 72 is connected to the rubber torsion linkages 73A, 73B by first and second pairs of u-bolts 77A, 77B. In this manner, the weight of the control station 25 and the operator is supported by the rubber torsion linkages 73A, 73B which are damped by the shock absorber 68. The U-bolts 77A, 77B may be moved up or down the rubber torsion linkage 73 to adjust the travel of the shock absorber 68. Alternatively, the shock absorber 68 may be directly pivotally connected to a component of the operator station 25 (i.e., with the support bracket 72 being eliminated).

The suspension system 54 is adjustable to change the amount of cushioning provided by the rubber torsion linkages 73A, 73B. The inner bar 71 (FIG. 9) is rotated relative to the outer tube 79 to "preload" the suspension system 54. The system 54 is locked at preload by moving an adjustment plate 43 connected to the inner bar 71. Once under preload, a fastener 87 (FIG. 10) may be tightened to fix the plate 43 and inner bar 71 to the operator station 25. The fastener 87 moves within a slot 45 within the plate 43 when being adjusted to its preload setting. A corresponding adjustment plate 50 (FIG. 12) and fastener 52 may be disposed on the chassis side to fix the preload. Once the fasteners 87 are tightened with the suspension system 54 under preload, the fasteners 76, 83 that connect to the torsion elements 65A, 65B may be tightened to clamp the torsion elements 65A, 65B to the chassis 12 and operator station 25, respectively. The suspension system 54 may include alternative adjustable features to account for changes in operator weight as further described below.

The shock absorber 68 may generally be any shock absorber available to those of skill in the art. Suitable shock absorbers 68 may include a piston rod which acts upon a hydraulic fluid that may be pushed and pulled through orifices in the shock absorber. The illustrated shock absorber is a damper that dissipates kinetic energy by converting it to heat.

Figure 21:
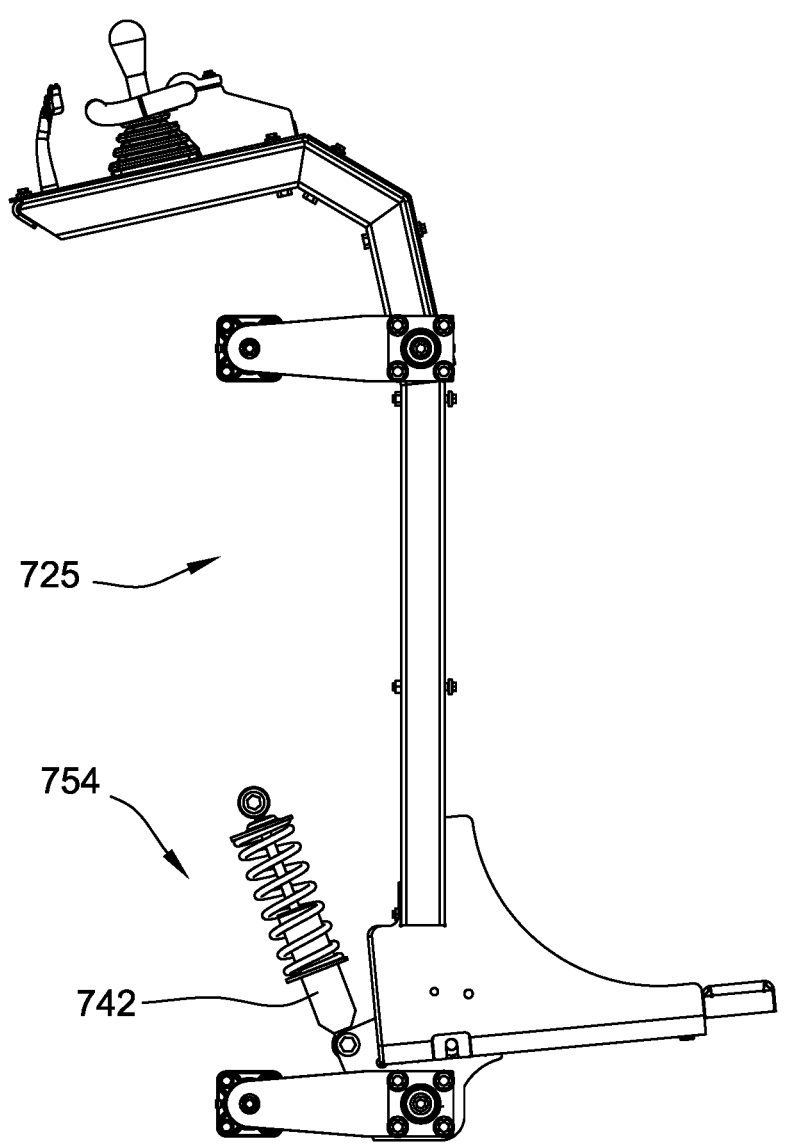
FIG. 21 is another embodiment of the suspension system that includes a coilover suspension element.
Figure 22:
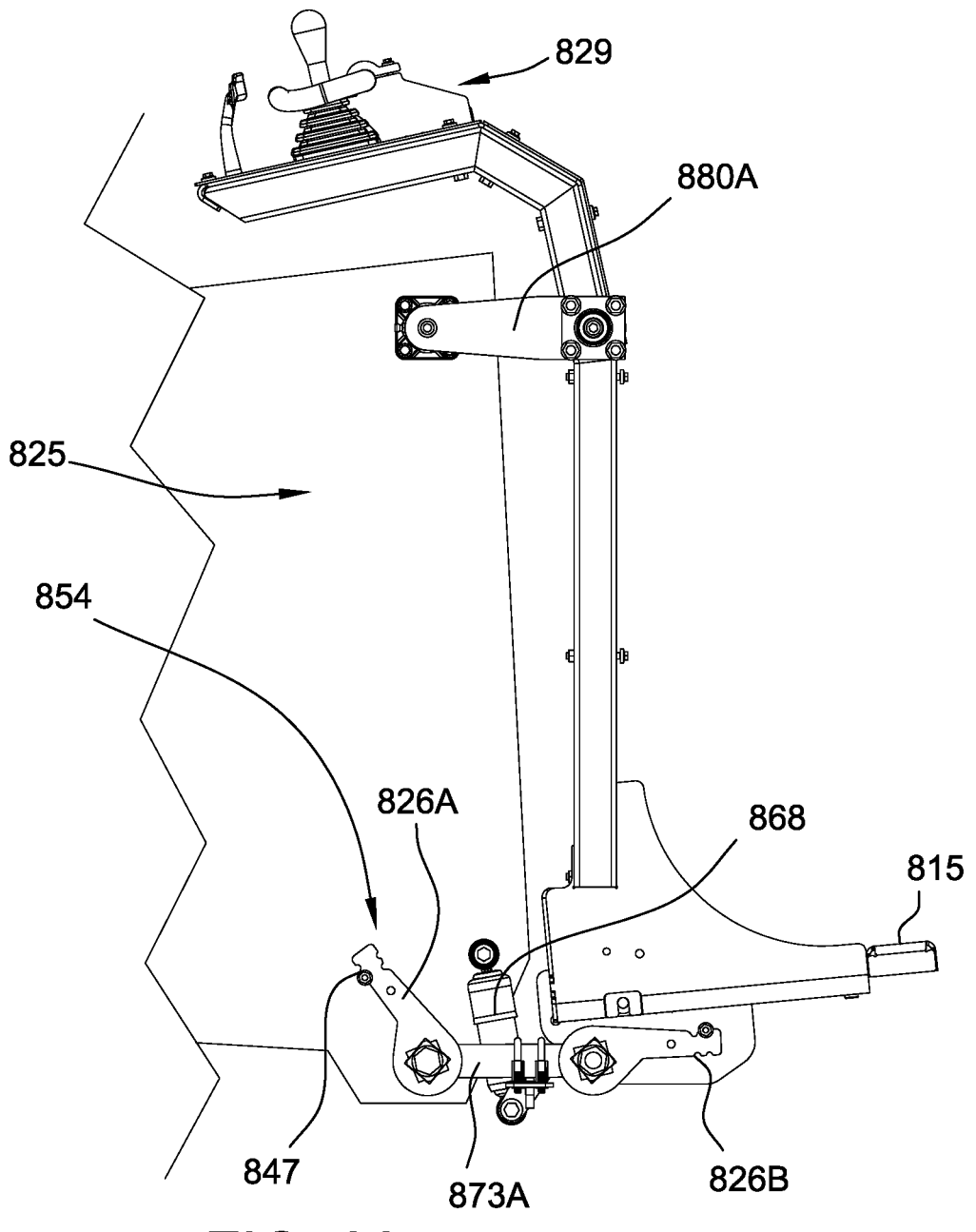
FIG. 22 is another embodiment of the work machine in which the suspension system is adjusted by a lever.
Figure 24:
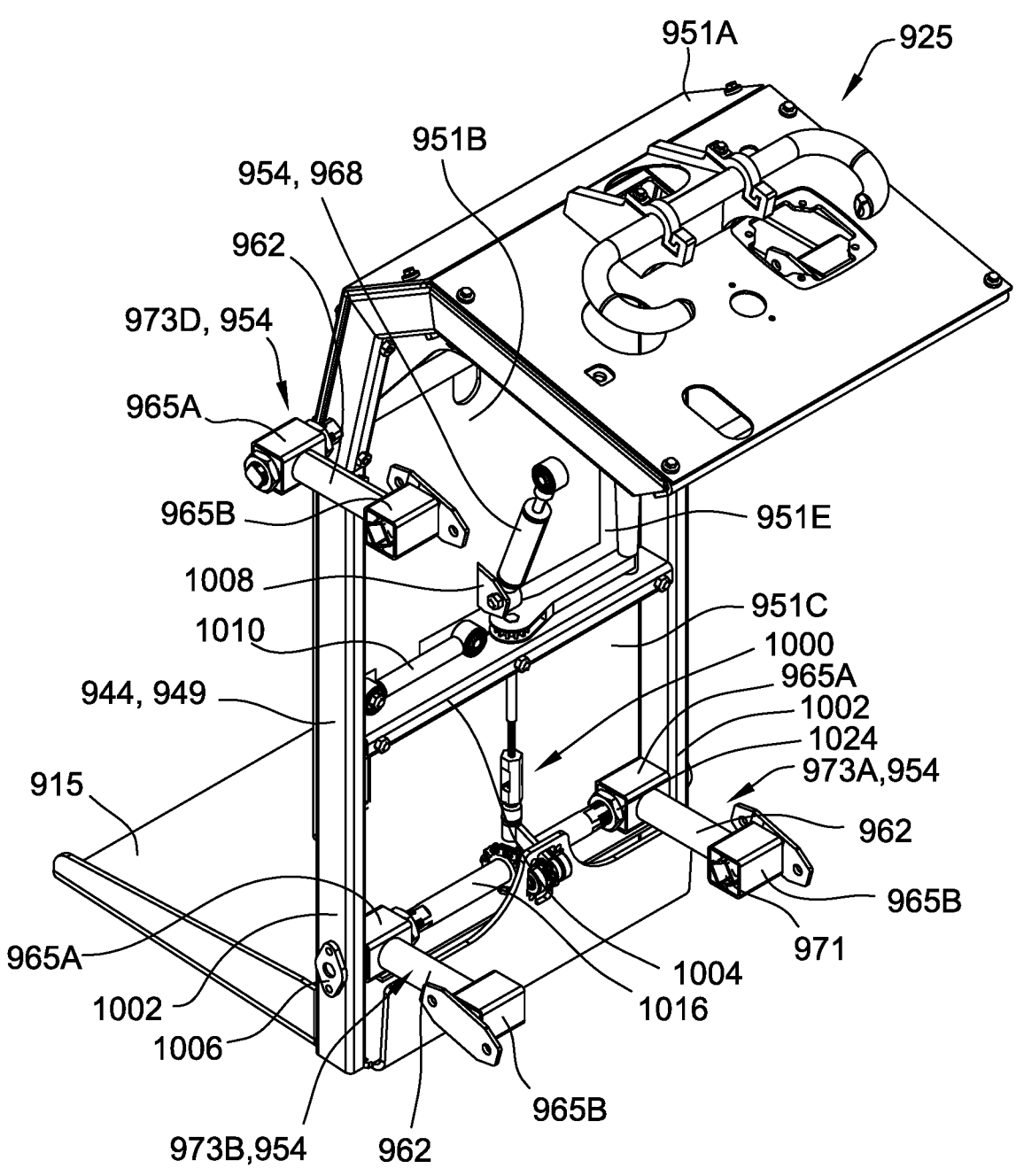
FIG. 24 is a perspective view of an operator station and a suspension adjustment assembly of the work machine.

The suspension system 54 may include a shock absorber 68 and rubber torsion linkages 73A, 73B (i.e., rubber torsion elements) as shown in the illustrated embodiment. In other embodiments, one or more rubber torsion linkages may be used without a shock absorber. Yet other embodiments of the suspension system 54 may include one or more coilover suspension elements (i.e., coil spring 742 as shown in FIG. 21), hydropneumatic suspension elements (i.e., gas spring which could also be used to adjust operator height), magnetorheological suspension elements (i.e., a magnetorheological fluid shock absorber), springs, or progressive stiffness conical bumpers. For example, such elements may replace or be used in combination with the rubber torsion elements (i.e., the bottom linkages 73A, 73B do not incorporate rubber torsion elements). For example, in some embodiments, the suspension system 54 includes the rubber torsion elements and the shock absorber is a precharged gas spring. In other embodiments, the shock absorber 68 is a spring and the rubber torsion elements are not included in the suspension system 54. In some embodiments, the suspension system 54 includes a sway bar (e.g., Panhard rod as shown in FIG. 24 described below or Watt's link) to control or reduce lateral movement of the operator station 25 relative to the chassis 12. Alternatives for rubber torsion linkages include a bolted (e.g., two-piece clam shell design) for the outer tube 79 of the rubber torsion element 65.

In the illustrated embodiment, each rubber torsion linkage 73 includes first and second torsion elements 65A, 65B. In other embodiments, the rubber torsion linkage 73 includes only one rubber torsion element 65.

Figure 11:
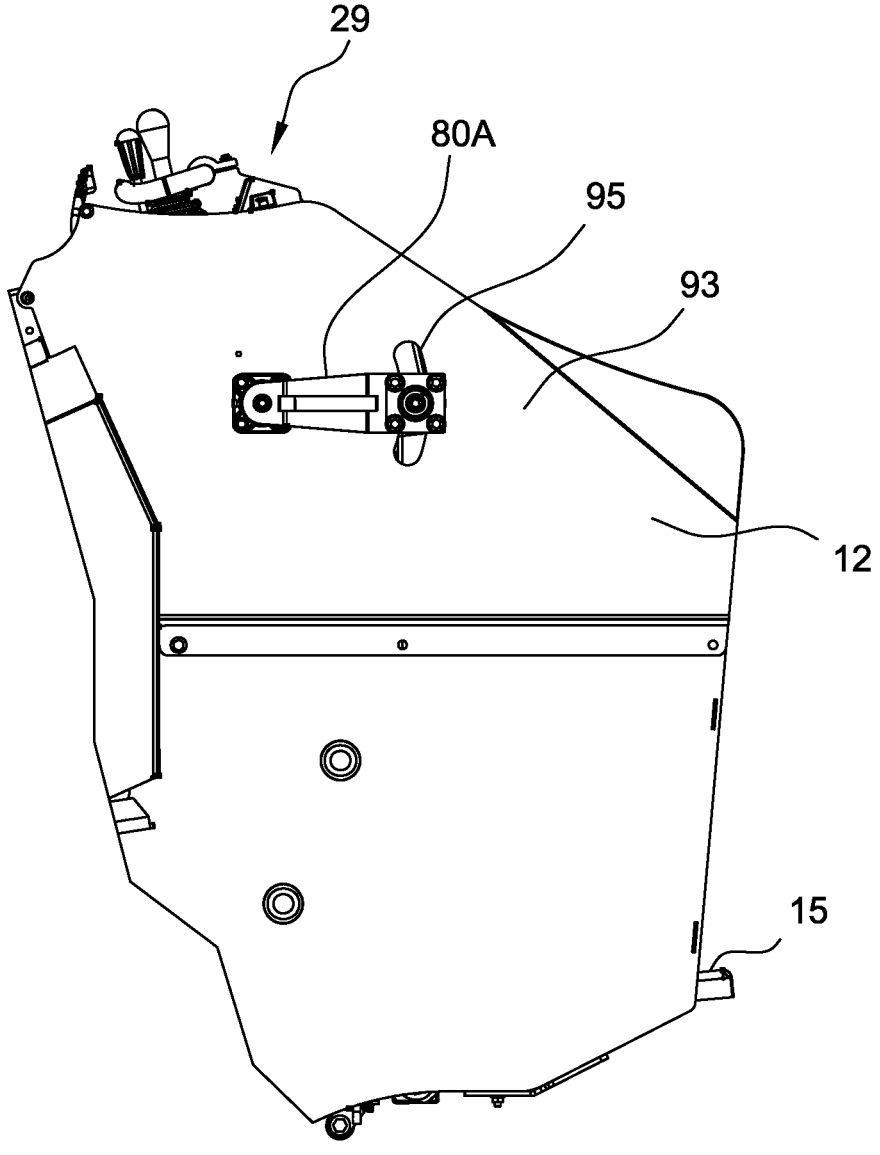
FIG. 11 is a partial side view of the work machine having components removed to show a support linkage of the operator station and a sidewall slot.

The suspension system 54 includes first and second support linkages 80A, 80B (FIG. 5) that are pivotally connected to the chassis 12 (FIG. 2) and are pivotally connected to the operator station 25 (i.e., to the operator station support frame 49). The first and second support linkages 80A, 80B help control movement of the control station 25. The first and second support linkages 80A, 80B are disposed exterior to a chassis sidewall 93 (FIG. 11). A linkage pin 94 (FIG. 6) connected to the operator station 25 extends through a sidewall slot 95 and moves up and down through the slot 95 as the operator station 25 moves.

Figure 19:
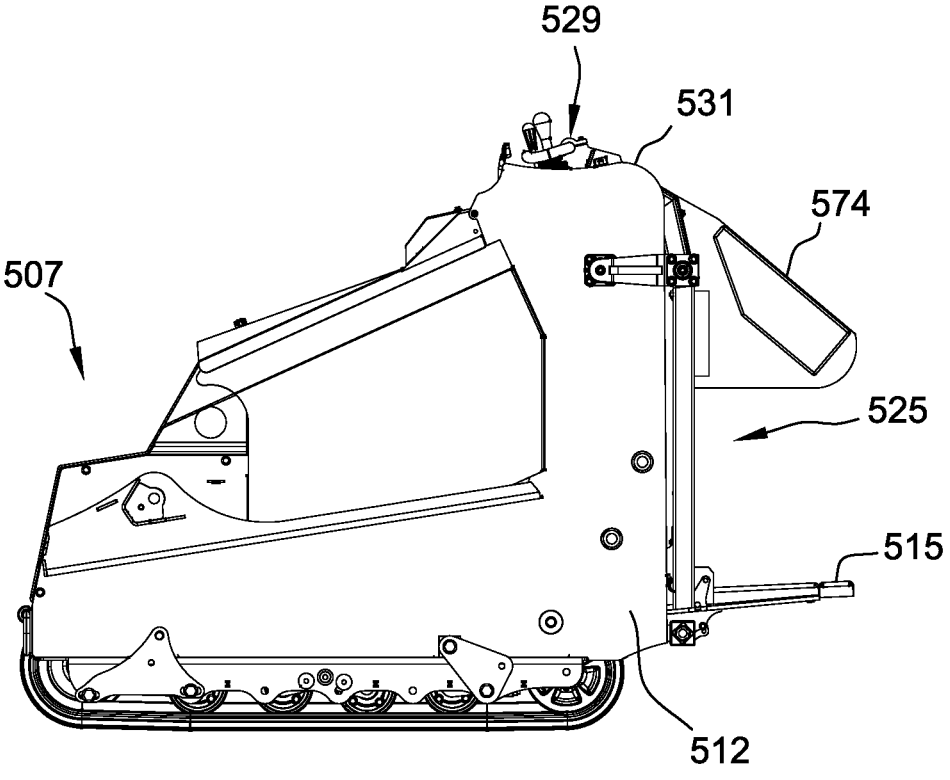
FIG. 19 is another embodiment of the work machine not having a portion of the chassis that extends behind a front of the operator standing platform.
Figure 20:
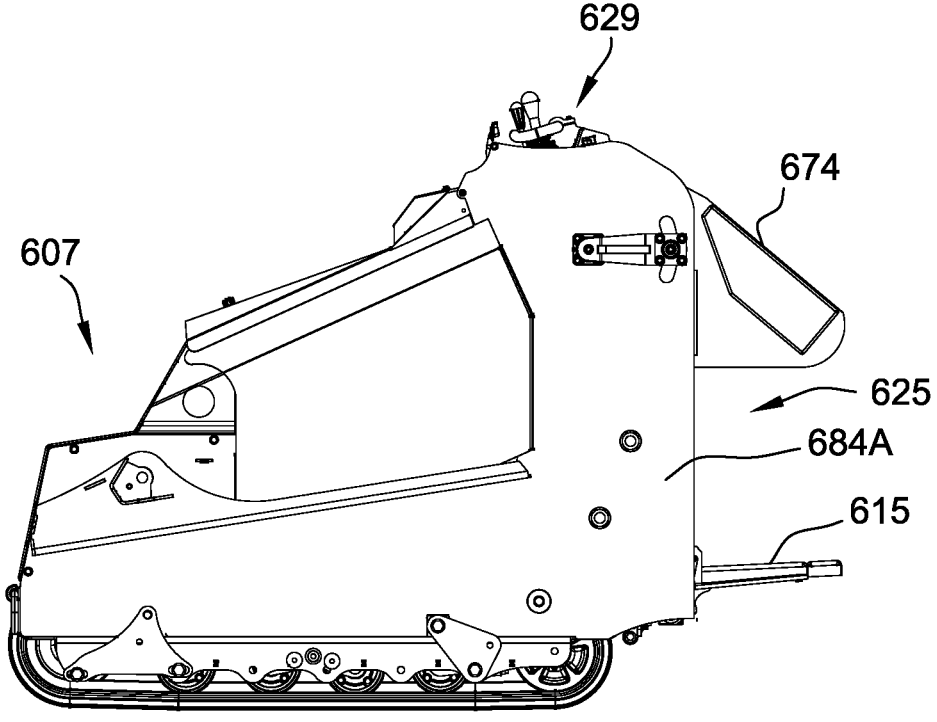
FIG. 20 is another embodiment of the work machine having a portion of the chassis that extends behind a front of the operator standing platform that is shorter than the portion in the embodiment of the work vehicle of FIGS. 2-4.

Referring again to FIG. 3, the chassis 12 includes a portion 82 that extends behind a front 19 (FIG. 5) of the operator standing platform 15 along the longitudinal axis A. The portion 82 that extends behind the front 19 of the platform 15 includes first and second extension members 84A, 84B. The first and second extension members 84A, 84B and the support platform 15 form a pocket 85 in which an operator may at least be partially disposed during operation of the work machine 7. In some embodiments (e.g., FIG. 18), at least a portion of the operator station (e.g., hip-thigh pad 374 and/or its supporting structure) extends behind the front portion of the operator platform 415 to form a pocket in which an operator may be at least partially disposed. In some embodiments, the work machine 7 includes extension members 84A, 84B that have padded portions to improve operator comfort. In other embodiments and as shown in FIG. 19, the work vehicle 507 does not include a portion of the chassis 512 that extends behind the front portion of the operator platform 515. In the embodiment of FIG. 20, the extension members 684A extend behind the front 19 (FIG. 5) of the platform 15 an intermediate amount (i.e., less than that shown in FIG. 5). As shown in FIGS. 19 and 20, the operator station 425 may include a hip-thigh pad 574, 674 (e.g., mounted to a side member such as a side panel, bar or frame) that moves with the operator control station 529, 629 and operator platform 515, 615.

Figure 12:
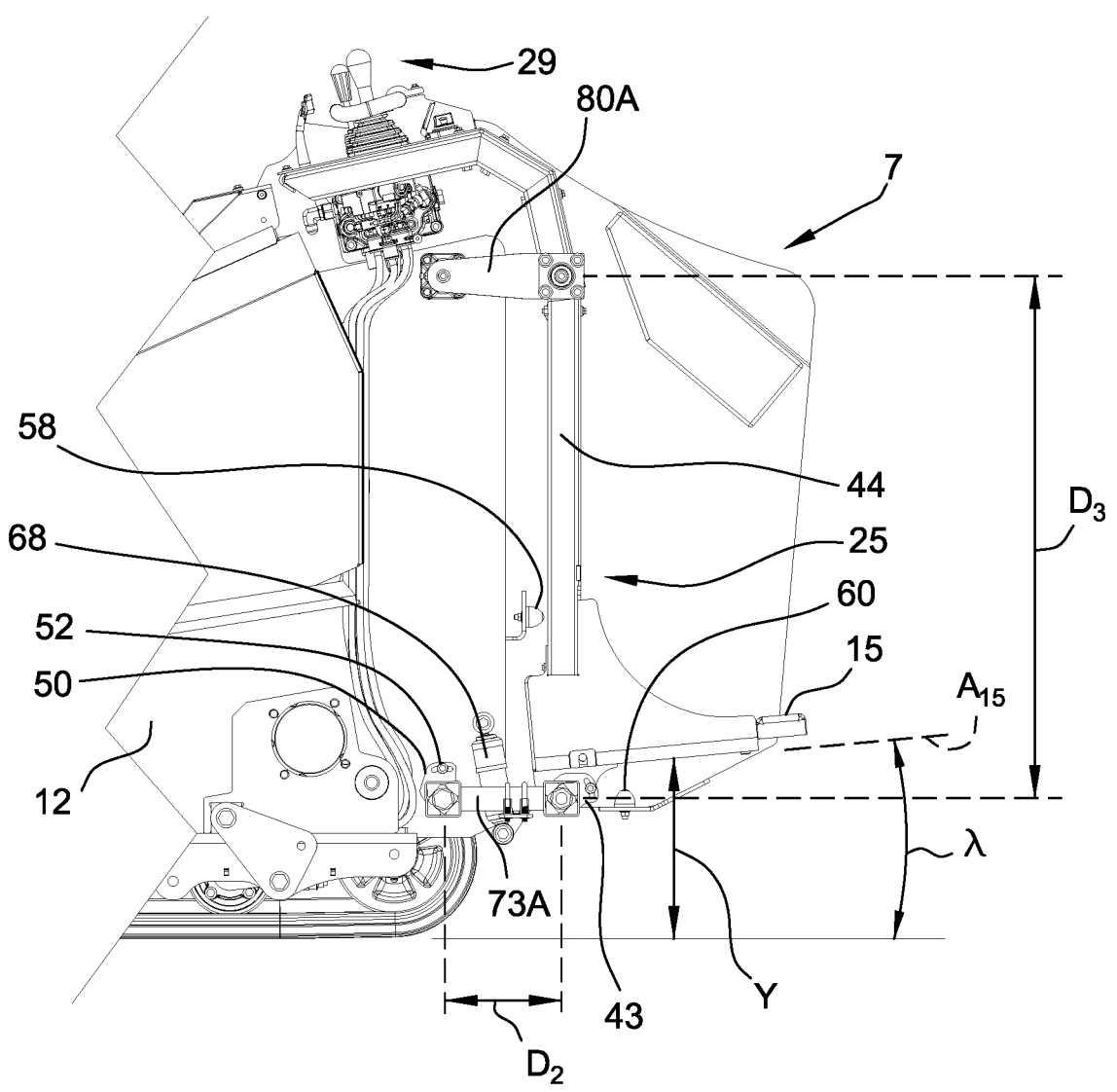
FIG. 12 is a partial side view of the work machine having components removed to show the operator station in a mid-range position relative to the chassis.
Figure 13:
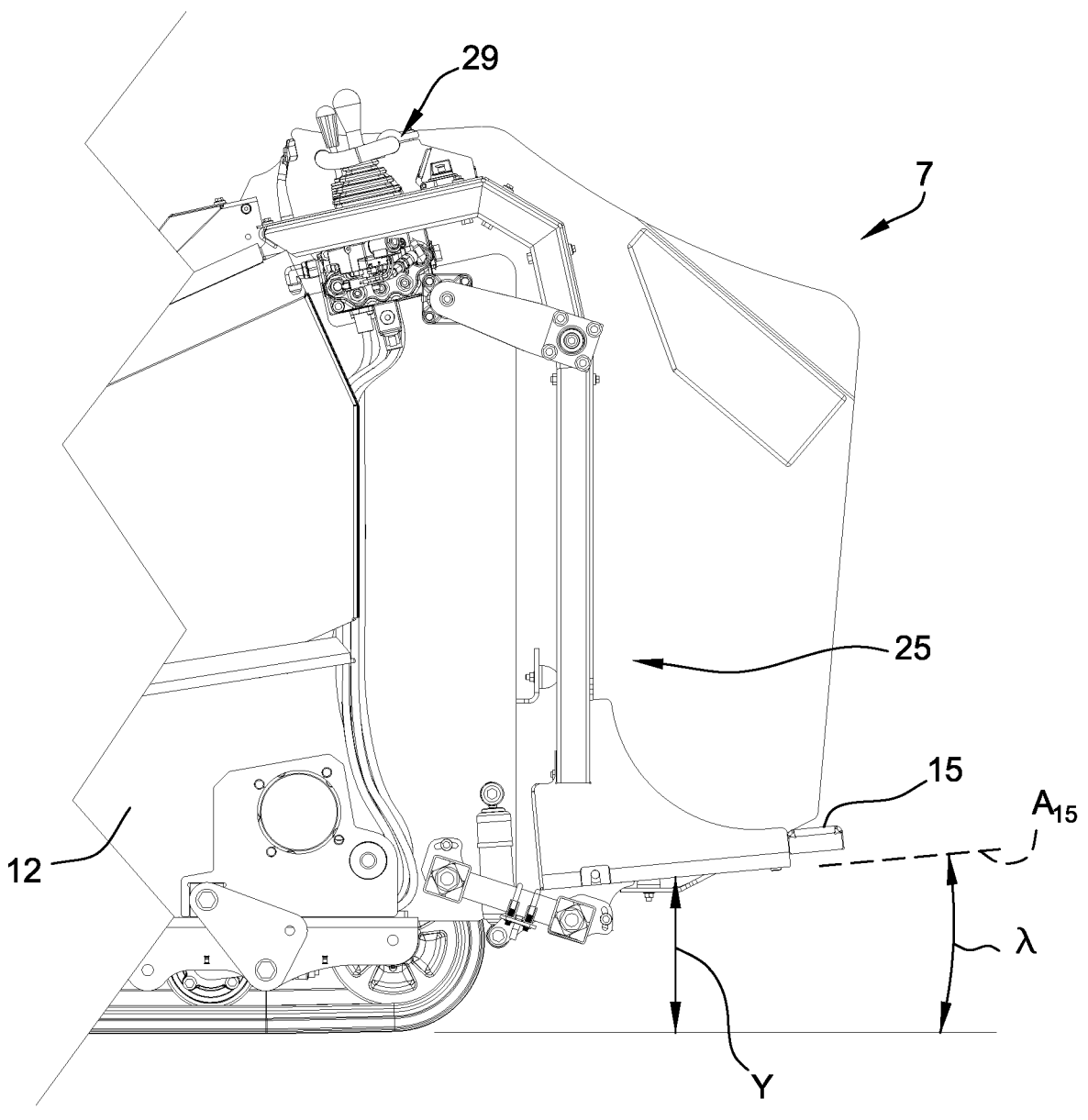
FIG. 13 is a partial side view of the work machine having components removed to show the operator station in a lowered position relative to the chassis.

The operator station 25, including both the operator platform 15 and the control station 29, are suspended from the chassis 12 and move together as the work machine 7 travels over uneven terrain. Because the rubber torsion linkages 73A, 73B and support linkages 80A, 80B extend generally perpendicularly to the ground (i.e., without being substantially angled upward or downward), most of the movement of the control station 25 during operation of the suspension system 54 is vertical. As shown in FIG. 12, the operator station 25 is a mid-range position in which an operator would be standing on the platform 15. The mid-range position in which an operator is positioned on the platform 15 allows for movement of the operator station downward (FIG. 13) and upward (FIG. 14) relative to the chassis 12 (e.g., 0.5 to 4 inches downward and 0.5 to 4 inches upward). As the work machine 7 encounters a change in terrain, the chassis 12 moves relative to the control station 25 (e.g., with the control station 25 deflected downward relative to the chassis 12 as shown in FIG. 13 or deflected upward relative to the chassis 12 as shown in FIG. 14 as shown by changes in distance Y from the ground to the center of the platform 15). The chassis 12 may include a first bump stop 58 (FIG. 12) that limits upward movement of the upper station 25 and a second bump stop 60 that limits downward movement of the upper station 25. The first and second bump stops 58, 60 may be connected to the chassis 12 (e.g., chassis bracket 70 and chassis sidewall 93, respectively). The bump stops 58, 60 are conical shaped and formed of a resilient material (e.g., rubber) that progressively increases in stiffness as a load is applied to the bump stops 58, 60. The resilient composition of the bump stops 58, 60 facilitates smooth engagement when the operator station 25 contacts the bump stops 58, 60.

The electrical connections for the controls and displays of the control station 25 may be flexible (e.g., by providing sufficient slack) to accommodate movement of the operator station 25 relative to the chassis 12. Further, if hydraulic or pneumatic controls are used, flexible hoses rather than hard-lines may be used to accommodate movement of the operator station 25.

The suspension system 54 may be adjustable as noted above by preloading the suspension by moving the adjustment plate 43 (i.e., there are infinite settings along the slot 45). In some embodiments, the suspension system 54 includes multiple discrete settings to pre-load the suspension to adjust for various operator weights. For example the system may be preloaded with a suspension adjustment as disclosed in U.S. Pat. No. 7,086,214, which is incorporated herein by reference for all relevant and consistent purposes.

In some embodiments, the suspension system 54 is configured to be locked in a fixed position (e.g., a rigid, non-suspended position).

Figure 23:
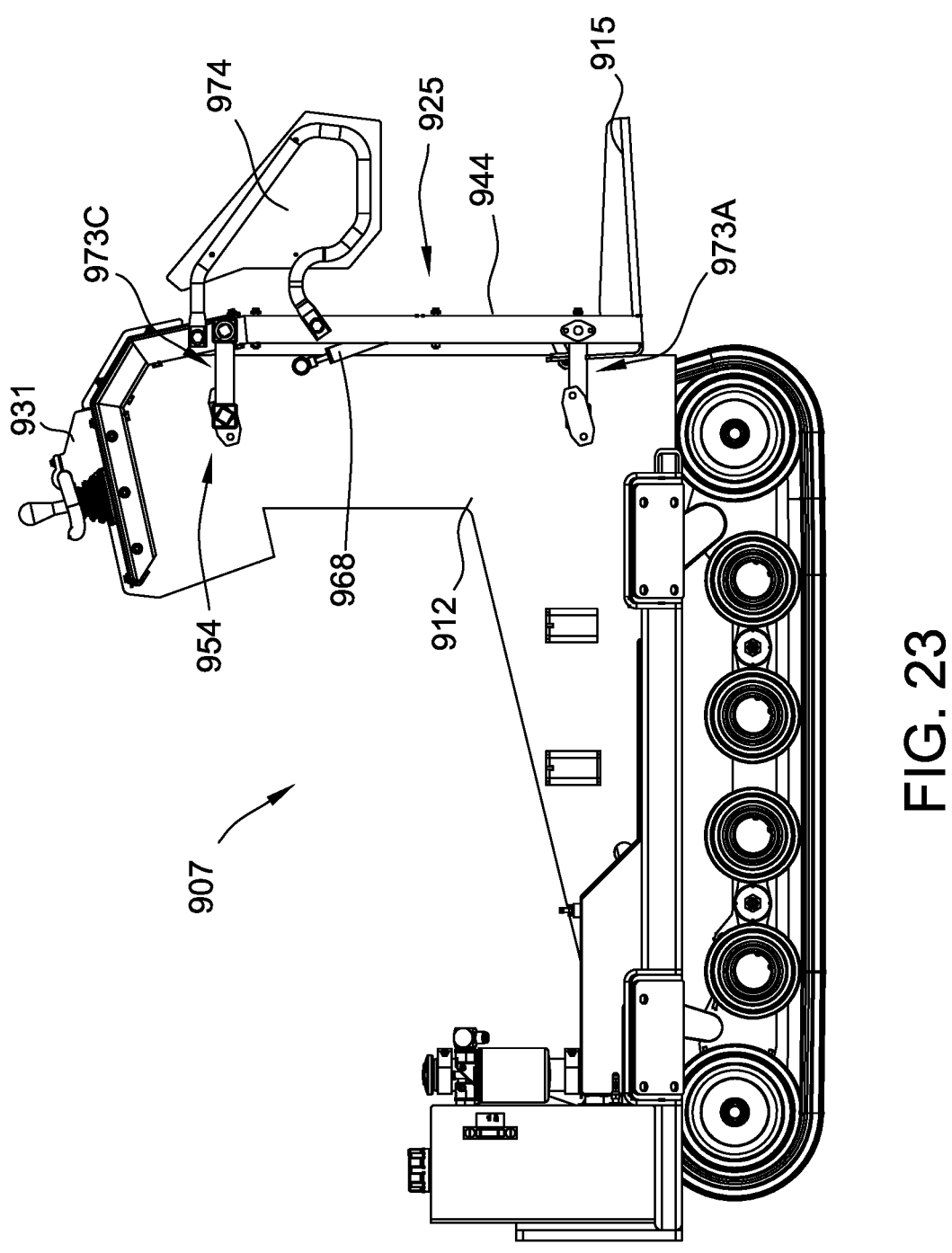
FIG. 23 is another embodiment of a work machine including a suspension system.

Another embodiment of a suspension system having preload adjustability is shown in FIG. 23. An adjustment lever or "key" 826A may be connected to the inner bar 71 (FIG. 9) of each rubber torsion element 65A, 65B of the rubber torsion linkage 873A. The lever 826A includes a stop or fastener 847 that limits movement of the inner bar to enable the linkage 873A to provide shock absorbance. The lever 826A may be rotated and repositioned to adjust the preload of the system 825. A second key 826B connected to the inner bar 71 may be used to adjust the preload on the other rubber torsion element of the linkage 873A.

In some embodiments, the suspension system 54 may be adjustable such as by adjusting the length of the rubber torsion bar linkages 73A, 73B to change the moment. Alternatively, the suspension system 54 described above could have a secondary suspension element (e.g., spring) which could be adjusted by an operator to change the pre-compression of the suspension system 54.

Figure 4:
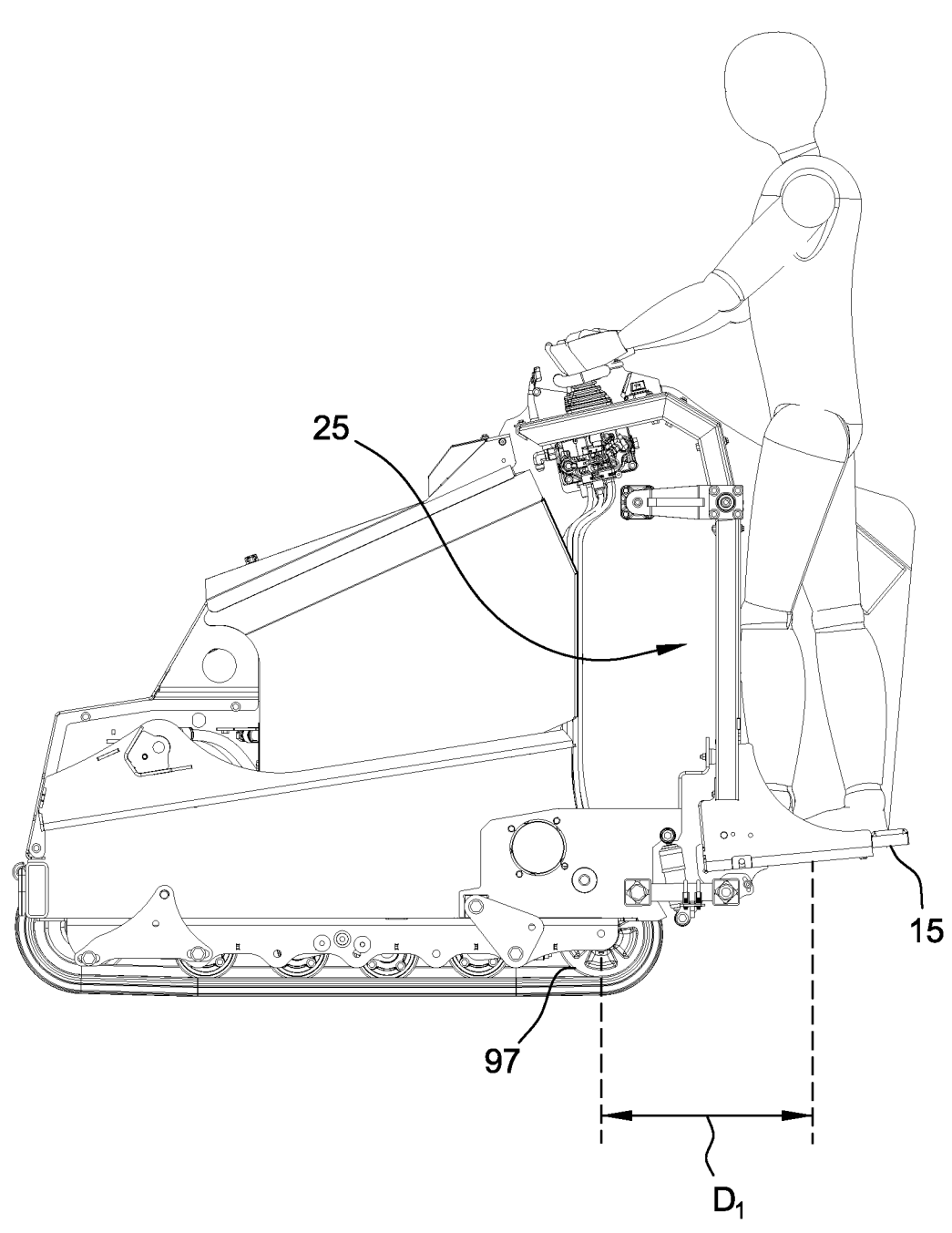
FIG. 4 is a side view of the work machine having components removed to show the operator station.

In the illustrated embodiment and as shown in FIG. 4, the operator platform 15 is offset from the drive mechanism 18 which amplifies movements of the chassis to the operator. For example, the center of the rearmost drive element 97 of the machine 7 (i.e., rearmost idler or drive sprocket in tracked machines or rear wheel as in wheeled embodiments) may be offset a distance $D_1$ from the center of the platform 15 (i.e., the center of the platform 15 is rearward to the center of the rearmost drive element 97).

Referring now to FIG. 12, the illustrated work machine 7 includes a "four bar linkage" composed of the chassis 12, the lower linkage 73A, the upper linkage 80A and the operator station 25 (e.g., operator station support frame 49). The length of the lower and upper linkages 73A, 80A (i.e., distance between point of connections with the chassis 12 and operator station 25) may generally be the same ($D_2$) and the distance between the connections in the chassis 12 and the distance between the connections in the operator station 25 ($D_3$) may also generally be the same. This arrangement enables the orientation of the platform 15 (i.e., inclination with the horizontal plane) to remain consistent relative to the chassis 12 through the range of travel of the operator station 25. As shown in FIGS. 12-14, the angle of inclination λ is consistent at the mid-range, lower and upper positions of the operator station 25. The four bar linkage is duplicated on the opposite side of the machine 7 and is composed of the chassis 12, the lower linkage 73B, the upper linkage 80B and the operator station 25.

In some embodiments of the work machine, each of the two lower linkages 73A, 73B and two upper linkages 80A, 80B of the embodiment of FIGS. 2-14 incorporate rubber torsion elements. In some embodiments, rather than having two lower linkages 73A, 73B and two upper linkages 80A, 80B, the work machine includes (1) a single lower linkage 73 and two upper linkages 80A, 80B or (2) a single upper linkage 80 and two lower linkages 73A, 73B. In such embodiments, any of the two upper/lower linkages or the single upper/lower linkage may incorporate one or more rubber torsion elements (e.g., with the other upper/lower linkage(s) also having one or more torsion elements or the other upper/lower linkage(s) not having any torsion elements incorporated therein).

Another embodiment of the work machine is shown in FIG. 15. The components shown in FIG. 15 that are analogous to those of FIGS. 2-14 are designated by the corresponding reference number of FIGS. 2-14 plus "100" (e.g., part 84 becomes 184). In the embodiment of FIG. 15, the work tool 3 is a mower deck. Similar to the machine of FIGS. 2-14, the operator station 125, including the operator platform 115 and control station 129, are suspended from the chassis 112 by a suspension system such as the suspension system 54 described in relation to the work machine of FIGS. 1-12.

Figure 17:
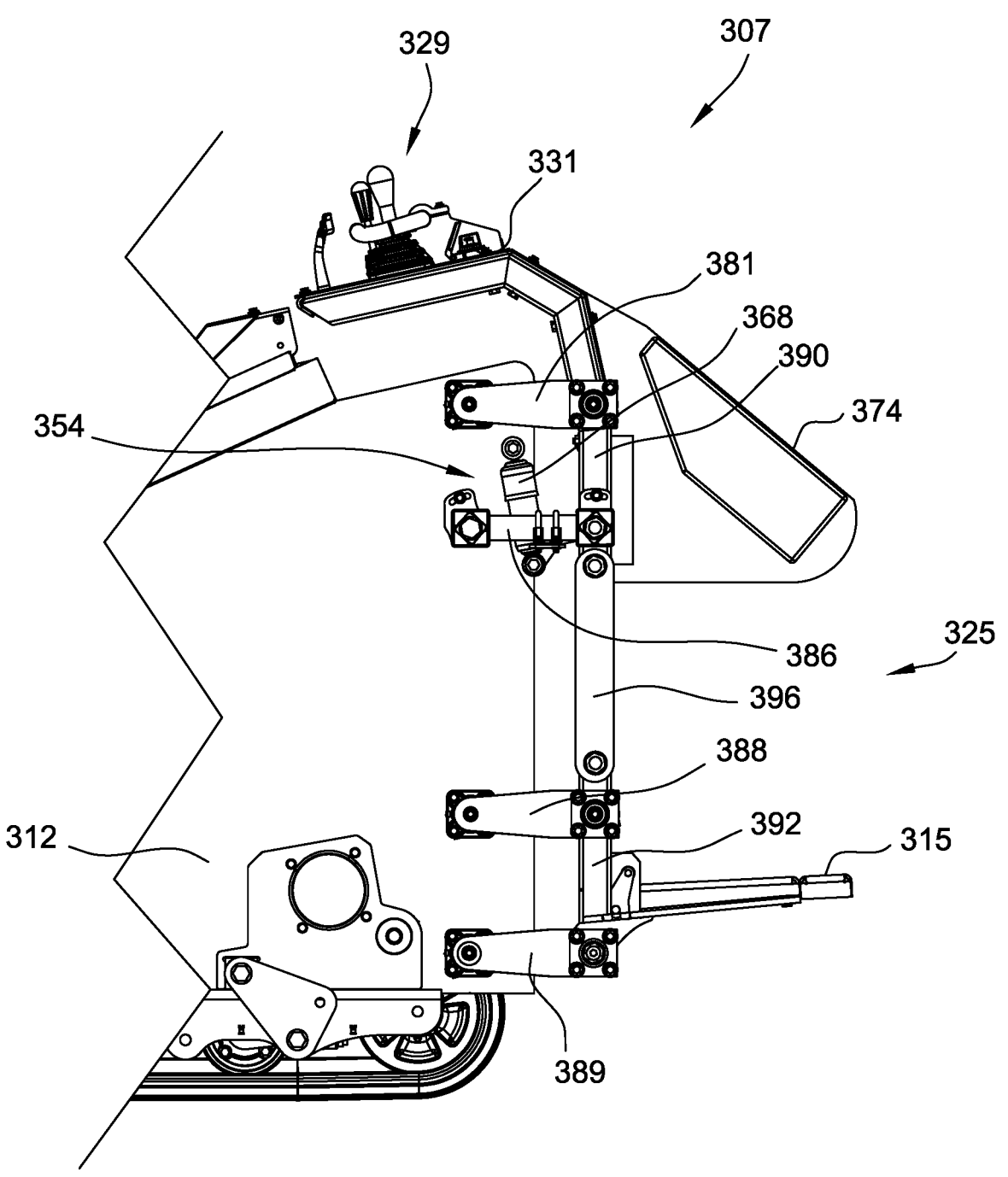
FIG. 17 is another embodiment of the work machine having a linkage that connects the control station panel to the operator platform.

Another embodiment of the work machine is shown in FIG. 17. The components shown in FIG. 17 that are analogous to those of FIGS. 2-14 are designated by the corresponding reference number of FIGS. 2-14 plus "300" (e.g., part 84 becomes 384). The operator station 325 may include a control station panel 331 supported by a four bar linkage composed of first and second linkages 381, 386 connected to chassis 312 and frame member 390. The control station panel 331 is supported by the frame member 390. The operator station 325 may also include an operator platform 315 supported by a second four bar linkage composed of third and fourth linkages 388, 389 connected to the chassis 312 and to a frame member 392. The two four bar linkages may be pivotally connected by a linkage 396 (e.g., metal bar, cable, spring, or spring with a damper). The work machine 307 includes a suspension system 354. In the embodiment illustrated in FIG. 17, the suspension system 354 includes a rubber torsion linkage (with the second linkage 386 being the rubber torsion linkage) and a shock absorber 368. The operator station 325 also includes a hip-thigh pad 374 (e.g., mounted to a side member) that moves with the operator platform 315 and control panel 331 (i.e., moves with the operator to improve operator comfort).

Figure 18:
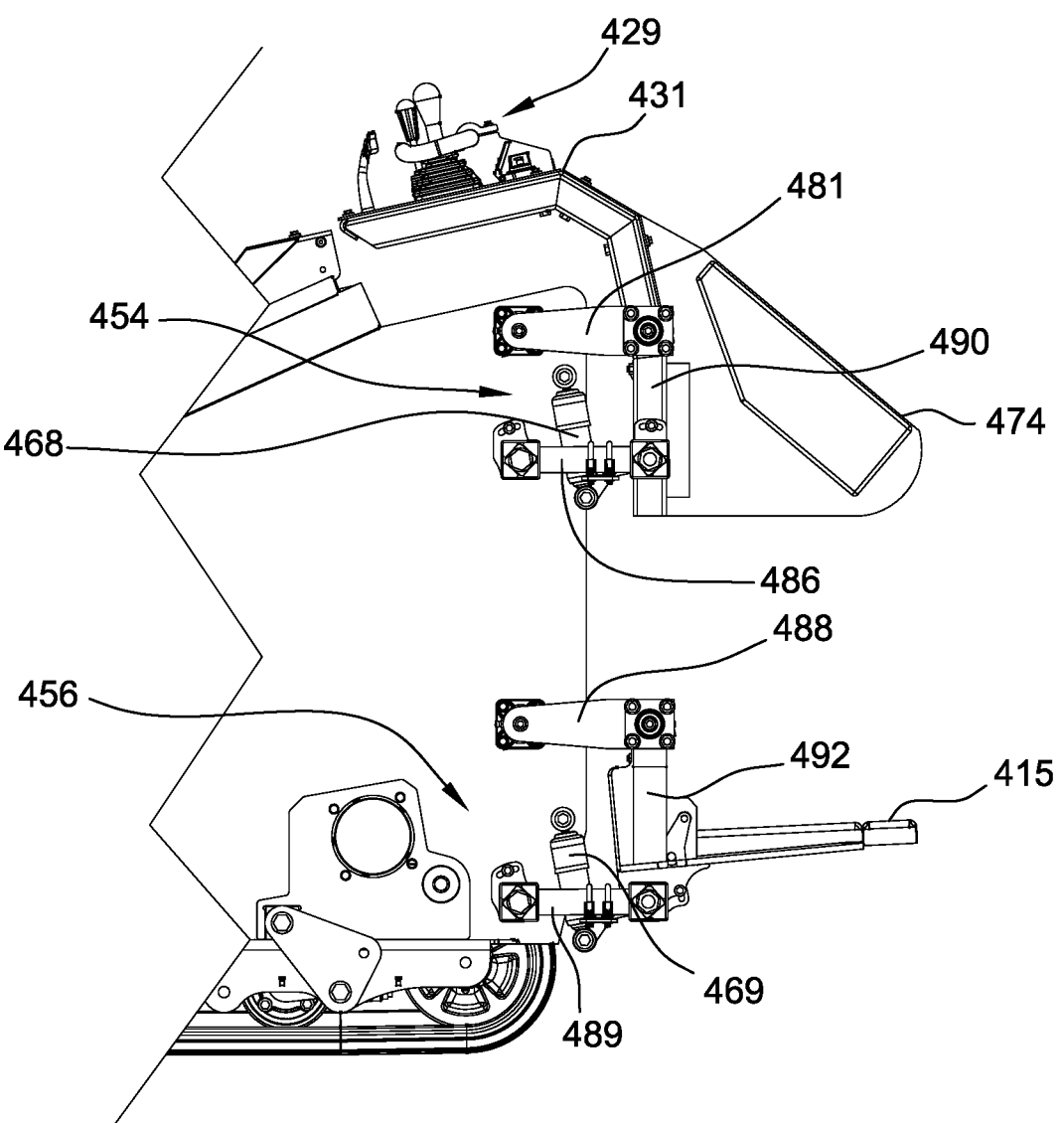
FIG. 18 is another embodiment of the work machine having an operator platform and control station panel with separate suspension systems.

Another embodiment of the work machine is shown in FIG. 18. The components shown in FIG. 18 that are analogous to those of FIGS. 2-14 are designated by the corresponding reference number of FIGS. 2-14 plus "400" (e.g., part 84 becomes 484). The work vehicle 407 is similar to the vehicle 307 of FIG. 17 but does not include a linkage 396 connecting the two four bar linkages. Instead, the vehicle 407 includes separate suspension systems 454, 456 for the operator control station 429 and operator platform 415. Each suspension system 454, 456 includes a rubber torsion linkage 486, 489 and shock absorber 468, 469. The vehicle 407 includes a hip-thigh pad 474 connected to the frame member 490 that moves with the operator station 429.

Another embodiment of a work machine 907 including an alternative suspension system 954, is shown in FIGS. 23-27. The components shown in FIGS. 23-27 that are analogous to those of FIGS. 2-14 are designated by the corresponding reference number of FIGS. 2-14 plus "900" (e.g., part 84 becomes 984). New components are designated by the "1000" reference numerals.

Figure 25:
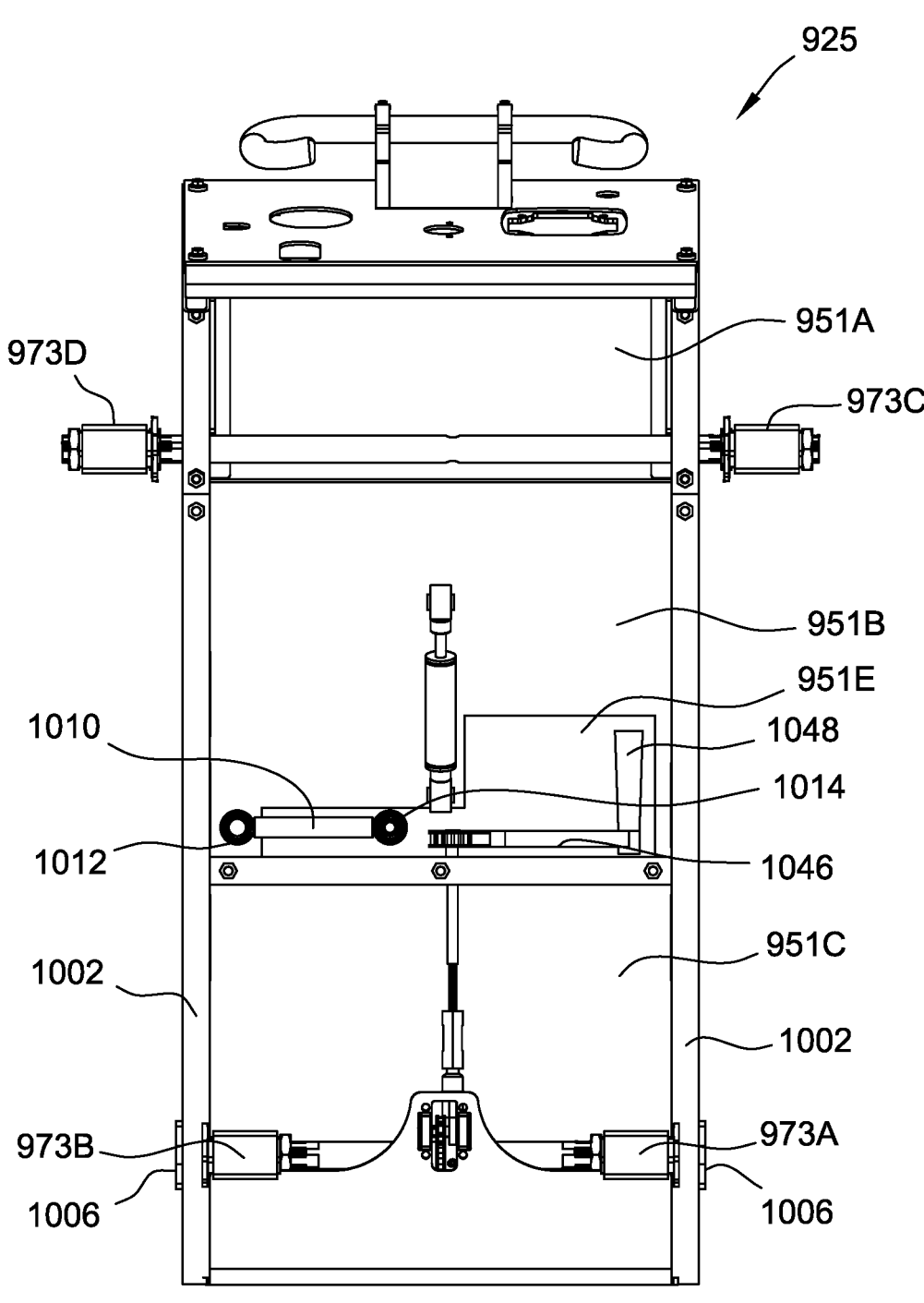
FIG. 25 is a front view of the operator station and the suspension adjustment assembly.

Referring to FIG. 23, the work machine 907 includes a chassis 912 and an operator station 925 connected to the chassis 912 by the suspension system 954. The operator station 925 includes a tie member 944 connected to a control station panel 931 and a standing platform 915 of the operator station 925. The operator station 925 further includes a hip-thigh pad 974 (e.g., mounted to the tie member 944) that moves with the operator control station 925 and operator platform 915. The work machine 907 is substantially the same as the work machine 7 (FIG. 3), except that, in the illustrated embodiment, the suspension system 954 includes both lower torsion linkages 973A, 973B and upper torsion linkages 973C, 973D (FIG. 25). The operator station 925 further includes a suspension adjustment assembly 1000 (FIG. 24) for adjusting the preload of the lower torsion linkages 973A, 973B. It should be understood that in other embodiments, a similar suspension adjustment assembly may also be provided for adjusting the preload of the upper torsion linkages 973C, 973D.

Referring to FIG. 24, the operator station 925 and the suspension system 954 are shown. The operator station 925 includes a support frame 949. The tie member 944 includes a portion of the support frame 949 and includes panels 951A-C connected to the support frame 949. The support frame 949 includes a pair of end bars 1002 and a connecting bar 1004 extending between the end bars 1002.

The suspension system 954 connects the operator station 925 to the chassis 912 (FIG. 23) of the work machine 907. The suspension system 954 includes a shock absorber 968 and the rubber torsion linkages 973A-D (973C shown in FIG. 25). The lower rubber torsion linkages 973A and 973B are each connected to the support frame 949 of the operator station 925 by mounts 1006 attached to the end bars 1002. The upper rubber torsion linkages 973C and 973D are each connected to the support frame 949 of the operator station 925 and are positioned outside of the end bars 1002. In other embodiments, the upper torsion linkages 973C and 973D may be connected to the support frame 949 by mounts (e.g., similar to mounts 1006) attached to the end bars 1002. Each of the rubber torsion linkages 973A-D includes a first torsion element 965A positioned adjacent the support frame 949, a second torsion element 965B spaced from the support frame 949, and a shaft 962 connecting the first and second torsion elements 965A, 965B. In other embodiments, the rubber torsion linkages 973A-D may include only one rubber torsion element 965 and the opposed element may be freely pivotable.

The shock absorber 968 is pivotally connected at a shock mount 1008 attached to a panel 951B and extends therefrom to pivotally connect to the chassis 912 (FIG. 23). The illustrated shock absorber 968 is a damper, similar to shock absorber 68 (FIG. 8) that dissipates kinetic energy by converting it to heat, though in other embodiments the shock absorber 968 may generally be any shock absorber available to those of skill in the art. In other embodiments, the suspension system 954 may be used with any of the above described work machines shown in FIGS. 1-22.

As shown in FIG. 24, in the illustrated embodiment, the operator station 925 includes a sway bar 1010 connected to the panel 951B and extending therefrom. In particular, referring to FIG. 25, the sway bar 1010 extends between a first end 1012 pivotally connected to the operator station 925 and a second end 1014 that is configured for pivotable connection with the chassis 912 (FIG. 23). The sway bar 1010 enables vertical movement of the operator station 925 relative to the chassis 912 (FIG. 23) while controlling or reducing lateral movement of the operator station 925 relative to the chassis 912. In the illustrated embodiment, the sway bar 1010 is a panhard rod, though in other embodiment, any suitable linkage may be used. The sway bar 1010 may be used with any of the embodiments shown in FIGS. 1-22.

Figure 26:
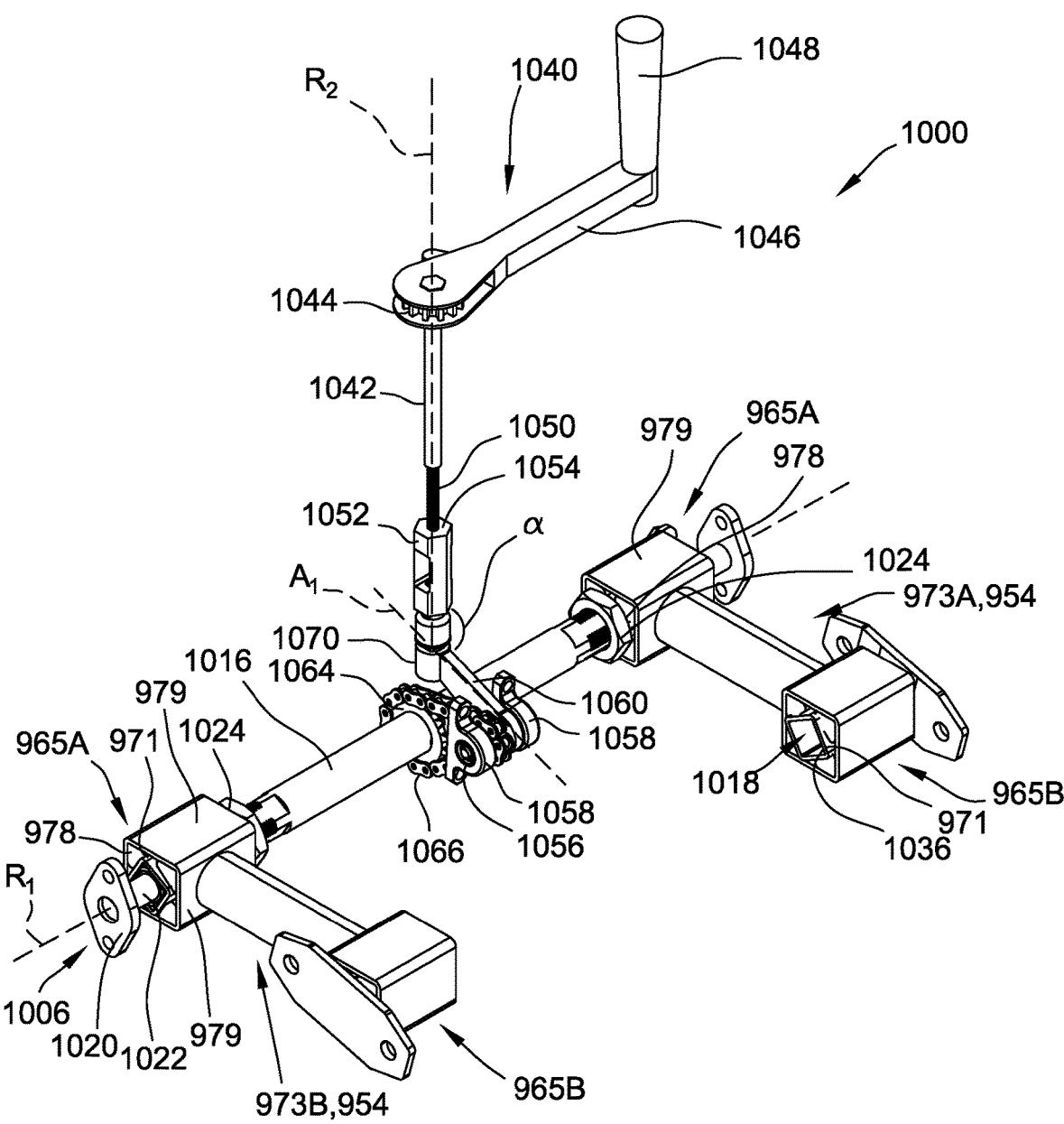
FIG. 26 is a perspective view of the suspension adjustment assembly and a portion of the suspension system of the work machine.

Referring to FIG. 26, the operator station 925 also includes the suspension adjustment assembly 1000 for adjusting a preload setting of the suspension system 954. More specifically, in the illustrated embodiment, the suspension adjustment assembly 1000 is configured to adjust the preload of the first torsion elements 965A of the lower torsion linkages 973A, 973B. In other embodiments, the suspension adjustment assembly 1000 may be configured to adjust the preload of any torsion elements 965A, 965B of the suspension system 954.

In the illustrated embodiment, similar to the embodiments described above, the preload setting of the torsion elements 965A, 965B is adjusted by rotating an inner bar 971 of the elements 965A, 965B to compress the rubber cords 978. Compression of the rubber cords 978 increases the amount of cushioning provided by the rubber torsion linkages 973A, 973B and adjusts a positioning and orientation of the operator station 925 relative to the chassis 912 (e.g., as shown in FIGS. 14 and 15). Over long periods of use, normal operating loads on the work machine 907 (FIG. 23) may result in drift of the suspension system 954 from a previously set preload setting. In addition, individual operators may have their own preferences for the preload setting and/or may want to tailor the preload setting to their specific body weight. Thus, the illustrated suspension adjustment assembly 1000 allows an operator to perform a controlled adjustment of the preload setting. The illustrated suspension adjustment assembly 1000 may be used with any of the above described work machines 7, 107, 207, 307, 407, 507, 607 and the operator stations 725, 825 shown in FIGS. 1-22.

The suspension adjustment assembly 1000 includes a torque shaft 1016 connecting the first torsion elements 965A of the lower torsion linkages 973A, 973B. The torque shaft 1016 extends into and mates with the inner bars 971 of the first torsion elements 965A. In particular, in the illustrated embodiment, the inner bars 971 are each hollow and define a cavity 1018 (e.g., as shown with respect the second torsion element 965B of the lower torsion linkage 973A) that is sized to receive the torque shaft 1016 therein. The mounts 1006 each include a plate 1020 and a neck 1022 extending from the plate 1020 and into the torque shaft 1016. Fasteners 1024 engage the torque shaft 1016 to restrict lateral movement of the torque shaft 1016 and/or the first torsion elements 965A.

Figure 27:
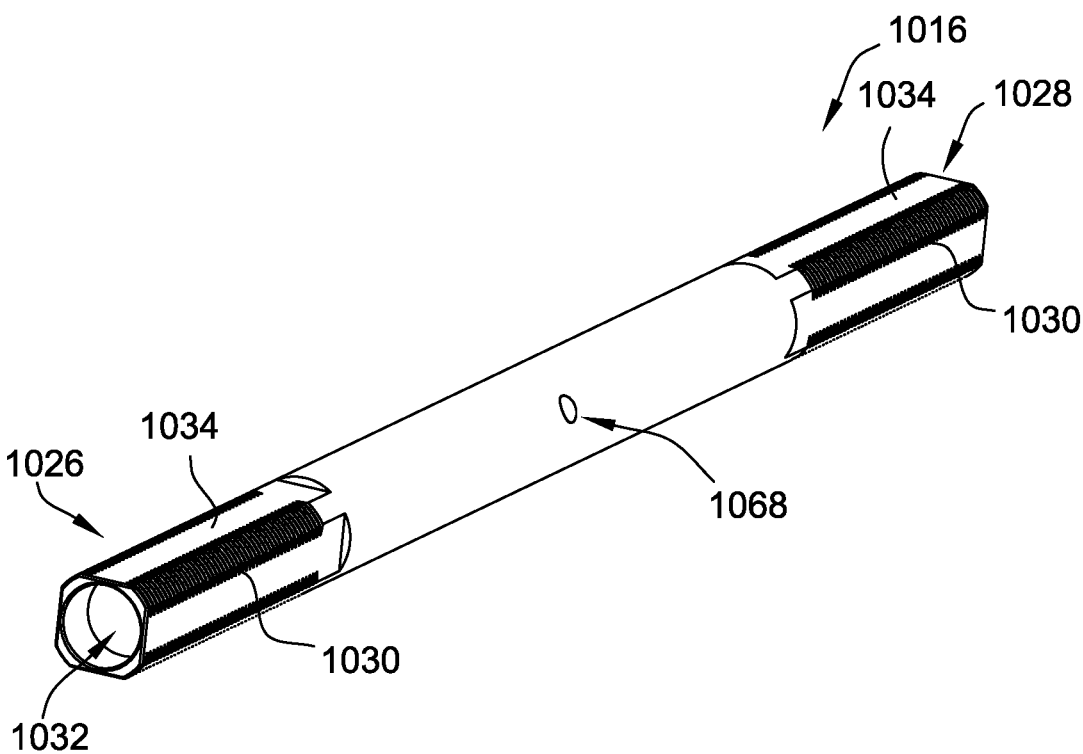
FIG. 27 is a perspective view of a shaft of the suspension adjustment assembly.

As shown in FIG. 27, the illustrated torque shaft 1016 includes end portions 1026, 1028 that include threads 1030 which are engaged by the fasteners 1024 (FIG. 26). The end portions 1026, 1028 also each have a generally rectangular shape that corresponds to the rectangular shape (and size so as to allow for mating engagement) of the inner bars 971 (FIG. 26). The end portions 1026, 1028 each define a laterally extending recess 1032 that are sized to receive the necks 1022 (FIG. 26) of the mounts 1006 therein. The recesses 1032 each have a generally circular shape corresponding to the circular shape of the necks 1022. The torque shaft 1016 is configured to rotate about a first rotational axis $R_1$ (FIG. 26) such that the end portions 1026, 1028 of the torque shaft 1016 rotate around the necks 1022 disposed in the recesses 1032.

Referring back to FIG. 26, rotation of the torque shaft 1016 about the first rotational axis $R_1$ drives rotation of the inner bars 971 within the outer tubes 979. As the torque shaft 1016 rotates about the first rotational axis $R_1$, an outer surface 1034 (FIG. 27) of the torque shaft 1016 engages an interior surface 1036 of the inner bars 971 and rotates the inner bars 971 within outer tubes 979 to compress the rubber cords 978 (similar to rubber cords 78, shown in FIG. 9), thereby preloading the suspension system 954. In other embodiments, the inner bars 971 and the end portions 1026, 1028 of the torque shaft 1016 have any suitable shape that enables the torque shaft 1016 to rotate the inner bars 971 as described herein.

The suspension adjustment assembly 1000 is operable to rotate the torque shaft 1016 about the first rotational axis $R_1$. The suspension adjustment assembly 1000 includes a ratchet wrench 1040, broadly a "rotational drive," and a first drive shaft 1042 connected to the ratchet wrench 1040. The ratchet wrench 1040 includes a ratchet 1044 that engages the first drive shaft 1042 and an arm 1046 extending from the ratchet 1044 to a handle 1048. The ratchet wrench 1040 is rotatable around a second rotational axis $R_2$, in a plane perpendicular to the second rotational axis $R_2$, to rotate the first drive shaft 1042 about the second rotational axis $R_2$. The second rotational axis $R_2$ is generally perpendicular to the first rotational axis $R_1$.

Referring back to FIG. 25, the panel 951B includes a cutout portion 951E (illustrated schematically in FIGS. 24 and 25) that is sized to allow the arm 1046 and the handle 1048 to pass through the panel 951B. In some embodiments, the cutout portion 951E is a door in the panel 951B that the operator opens to access and rotate the handle 1048 while standing on or near the platform 915 (FIG. 24).

Referring back to FIG. 26, the first drive shaft 1042 includes a threaded portion 1050 that is received within a coupling 1052 of the suspension adjustment assembly 1000. In particular, the coupling 1052 includes a threaded bore (not shown) defined in a first or upper end 1054 of the coupling

1052 that receives the threaded portion 1050 of the first drive shaft 1042. The threaded portion 1050 of the first drive shaft 1042 engages threads within the threaded bore of the coupling 1052 such that rotation of the first drive shaft 1042 about the second rotational axis $R_2$ moves the coupling 1052 vertically (i.e., along the second rotational axis $R_2$). The ratchet wrench 1040 locks a rotational position of the first drive shaft 1042 within the coupling 1052. In other embodiments, any other suitable rotational locking device may be used.

The suspension adjustment assembly 1000 further includes a second drive shaft 1056 that is offset from the torque shaft 1016. The second drive shaft 1056 is rotatably received within bearings 1058 that attach to the chassis 912 (FIG. 23). An arm 1060 and a first sprocket (not shown) are securely attached to the second drive shaft 1056 and rotate with the second drive shaft 1056. A second sprocket 1064 is securely attached to the torque shaft 1016 and a drive chain 1066 extends around the first and second sprockets 1064. The second sprocket 1064 is fixed with respect to the torque shaft. For example, the second sprocket 1064 may be engaged with an attachment aperture 1068 (FIG. 27) defined in the torque shaft 1016. The second sprocket 1064 may be connected to the torque shaft 1016 by other methods (e.g., directly connected such as be welding).

In the illustrated embodiment, the arm 1060 extends along an arm axis $A_1$ between the second drive shaft 1056 and a distal end 1070 of the arm 1060. The arm 1060 is connected at its distal end 1070 to the coupling 1052 by a ball joint (not shown). The ball joint restricts the coupling 1052 from rotating with the first drive shaft 1042 as the first drive shaft 1042 rotates while providing a pivotable interface between the arm 1060 and the coupling 1052. The pivotable interface provided by the ball joint allows for adjustment of an interface angle $\alpha$, defined between the second rotational axis $R_2$ and the arm axis $A_1$, as the coupling 1052 is moved vertically along the first drive shaft 1042. In some embodiments, at least one of the coupling 1052 and the arm 1060 includes a projection (not shown) that is received within a socket (not shown) defined in the other of the arm 1060 and the coupling 1052. In such embodiments, the projection engages the socket to restrict rotation of the coupling 1052 about the second rotational axis $R_2$, while enabling pivotable adjustment of the interface angle $\alpha$. Though described herein as a "ball joint" it should be understood that the projection does not necessarily have a ball or spherical shape. For example, and without limitation, in some embodiments the projection has a hexagonal shape. In other embodiments, the arm 1060 and the coupling 1052 are connected by any suitable connection that enables the suspension adjustment assembly 1000 to function as described herein.

To increase the suspension or preloading of the first torsion elements 965A, an operator accesses the handle 1048 through the cutout portion 951E in the panel 951B (FIG. 25) and rotates the handle 1048 within a plane generally perpendicular to the second rotational axis $R_2$ (e.g., in the counter-clockwise direction as shown in FIG. 26). In some embodiments, a guide chart or indicator may be included to guide the operator's rotation of the handle 1048 to reach a desired preload setting. For example, in some embodiments, the guide chart associates the orientation of the operator station 925 to the chassis 912 (FIG. 23) with a particular preload setting. In such embodiments, a level detector (not shown) may be provided and the operator may adjust the preload until the level reading from the level detector matches a level reading in the guide chart associated with a desired preload setting. In other embodiments, at least one of the chassis 912 (FIG. 23) and the operator station 925 (FIG. 24) includes a visual indicator that identifies a particular preload setting.

Rotation of the handle 1048 rotates the first drive shaft 1042 about the second rotational axis $R_2$ (e.g., in the counter-clockwise direction as shown in FIG. 26). As the threads on the threaded portion 1050 rotate about the second rotational axis $R_2$, the coupling 1052 is moved vertically upwards along the first drive shaft 1042 by the engagement between the internal threads (not shown) of the coupling 1052 and the threads on the first drive shaft 1042. Vertical movement of the coupling 1052 along the first drive shaft 1042 causes the distal end 1070 of the arm 1060 to rotate. Rotation of the arm 160 causes the second drive shaft 1056 to rotate (e.g., in the clockwise direction as shown in FIG. 26).

Rotation of the second drive shaft 1056 in the clockwise direction rotates the first sprocket (not shown) in the clockwise direction, thereby rotating the drive chain 1066 and second sprocket 1064 causing the torque shaft 1016 to rotate in the clockwise direction. In the illustrated embodiment, during preload adjustments the second drive shaft 1056 and the torque shaft 1016 are rotated in the same rotational direction. As the second sprocket 1064 rotates the torque shaft 1016, the torque shaft 1016 engages and rotates the inner bars 971 of the first torsion elements 965A, thereby compressing the rubber cords 978 to increase the preload on the first torsion elements 965A. When a desired preload setting is reached, the ratchet 1044 locks the rotational position of the first drive shaft 1042 to likewise lock the preload setting of the first torsion elements 965A. In other embodiments, a separate locking mechanism, such as a latch or fastener (not shown) may be provided to lock the rotational position of the first drive shaft 1042 and allow for removal of the ratchet wrench 1040 after a preload adjustment is made. Moreover, the ratchet wrench 1040 may include a switch (not shown) for reversing a driving rotational direction of the first drive shaft 1042 by the handle 1048. To decrease the suspension or preloading of the first torsion elements 965A, the operator adjusts the switch to reverse the rotational driving rotational direction of the ratchet wrench 1040 and rotates the handle 1048 in substantially the same manner as described above with respect to increasing the preloading of the first torsion elements 965A.

The suspension adjustment system 1000 allows for preload adjustments by rotation of the torque shaft in the range of −20 degrees to 20 degrees or, as in other embodiments, −15 degrees to 15 degrees or even −10 degrees to 5 degrees from a neutral preload setting (i.e., a position in which the rubber cords 978 are at a minimum compression by the inner bar 971). The range of preload adjustment may be limited by bump stops (such as first and second bump stops 58, 60 shown in FIG. 12). As described above, the suspension adjustment system 1000 allows for individual operators to adjust the preload setting based on their individual body type or preferred ride setting. As an example, while 15 degrees of rotation from the neutral setting may be suitable for a 150 pound operator, a 200 pound operator may require an adjustment of 20 degrees of rotation from the neutral setting to achieve a similar level of cushioning.

Though the illustrated embodiment suspension adjustment assembly 1000 is configured to change the preload of the first torsion elements 965A of the lower torsion linkages 973A, 973B, it should be understood that in other embodiments, the suspension adjustment assembly 1000 may be used to adjust the preload setting of any of the torsion elements 965A, 965B on any of the torsion linkages 973A-D. Moreover, the suspension adjustment assembly 1000 may also be used to adjust the preload setting on an isolated torsional element (i.e., torsional elements that are not connected by a shaft 962 (FIG. 24)). Additionally, other rotational drive mechanisms may be used to rotate the torque shaft 1016 within the inner tubes 971 and adjust the preload setting. Examples of additional rotational drive mechanisms contemplated by this disclosure include, without limitation, gear drives, planetary drives, hydraulic motors, a wrench, and a hydraulic cylinder.

Figure 28:
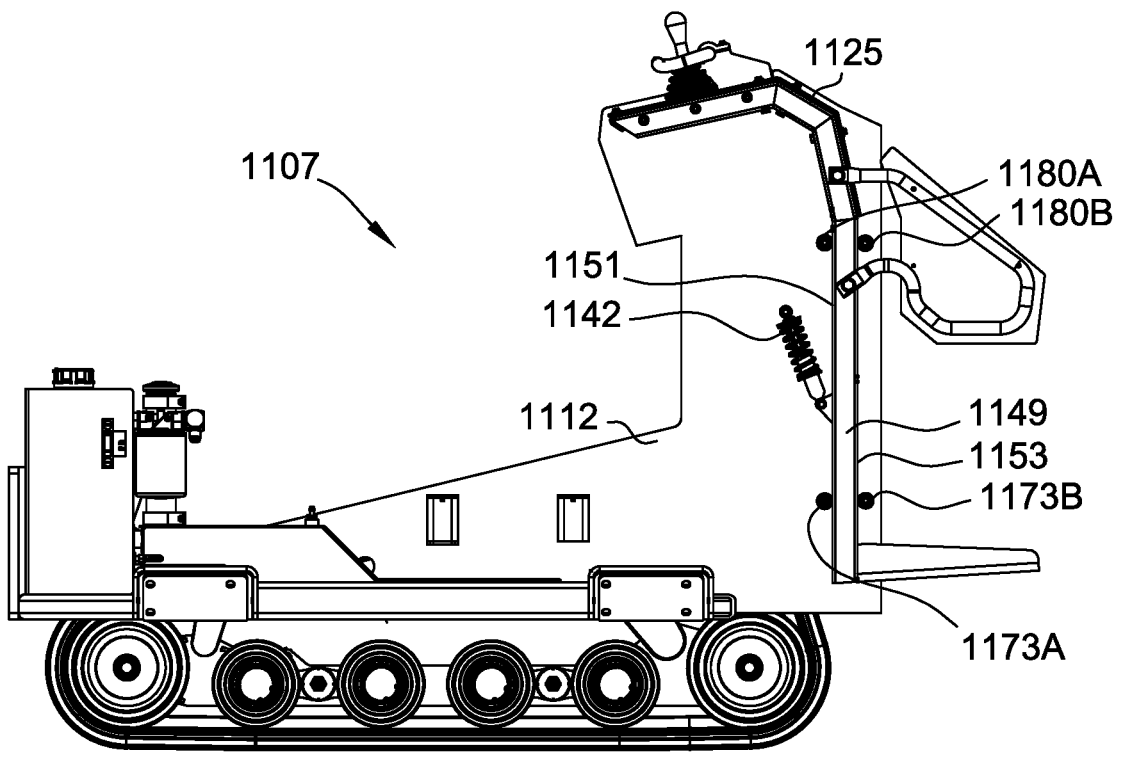
FIG. 28 is another embodiment of a work machine that includes slide elements.

Another embodiment of the work machine is shown in FIG. 28. The components shown in FIG. 28 that are analogous to those of FIGS. 2-14 are designated by the corresponding reference number of FIGS. 2-14 plus "1100" (e.g., part 84 becomes 1184). The work machine 1107 is similar to the vehicle 907 of FIGS. 23-27 but does not include torsion linkages 973A-D connecting the operator station 1125 to the chassis 1112. Additionally, the work machine 1107 includes upper slide elements 1180A, 1180B and slide elements 1173A, 1173B that are mounted to the chassis 1112 and engage the support frame 1149 of the operator station 1125.

In the illustrated embodiment, the slide elements 1173A, 1173B, 1180A, 1180B are each bearings mounted on a corresponding shaft (not shown) that is attached to the chassis 1112. In particular, a front upper slide element 1180A and a front lower slide element 1173A each contact a front surface 1151 of the support frame 1149. A rear upper slide element 1180B and a rear lower slide element 1173B each contact a rear surface 1153 of the support frame 1149. The upper slide elements 1180A, 1180B and the lower slide elements 1173A, 1173B allow for vertical sliding movement of the support frame 1149 relative to the chassis 1112, while restraining longitudinal movement (i.e., to the left/right of the page in FIG. 28) of the support frame 1149 relative to the chassis 1112. In other embodiments, a sway bar (e.g., similar to sway bar 1010 shown in FIG. 25) or one or more additional sliding elements may also be provided to restrain lateral movement (i.e., into and out of the page in FIG. 28) of the support frame 1149.

The slide elements allow for vertical sliding movement of the support frame 1149 relative to the chassis 1112, while restraining longitudinal movement (i.e., to the left/right of the page in FIG. 28) of the support frame 1149 relative to the chassis 1112. In other embodiments, the slide elements 1173A, 1173B, 1180A, 1180B may be one or more wear strips that are positioned at an interface between the support frame 1149 and the chassis 1112 and allow for vertical sliding movement of the support frame 1149 relative to the chassis 1112. The wear strips may be formed of any suitable low friction polymer or plastic, such as an ultra-high-molecular-weight polyethylene.

In the illustrated embodiment, a suspension element 1142 is pivotally coupled to the chassis 1112 and the support frame 1149. The suspension element 1142 supports the support frame 1149 on the chassis 1112 and controls vertical movement of the operator station 1125 relative to the chassis 1112. In the illustrated embodiment, the suspension element 1142 is a coil spring. In other embodiments, the suspension element may include a spring, an airbag, or any other suspension element that is suitable for controlling vertical movement of the operator station 1125 relative to the chassis 1112.

Compared to conventional work machines, work machines of embodiments of the present disclosure have several advantages. By suspending the control station and the operator platform from the chassis (e.g., with a suspension element such as a rubber torsion linkage) the platform and operator controls (and hand grip bar) move together as the suspension operates which reduces shock and operator fatigue and improves control of the operator controls for controlling movement of the work machine. This is particularly advantageous in embodiments in which the operator station is offset from the rear drive element (e.g., most rearward idler or drive sprocket in tracked machines) because the offset amplifies movements of the chassis to the operator. Use of rubber torsion 1 dissipates energy such as vibrational energy to improve operator ride. In embodiments having a four bar linkage (i.e., upper and lower linkages connected to the chassis and operator station), the operator platform may be maintained at a consistent position (e.g., angle of inclination) through the range of travel of the operator station. In embodiments having a suspension adjustment assembly, an operator may easily perform a controlled adjustment of the suspension preload to accommodate individual operator preferences and compensate for drift in the preload setting that may occur over long periods of regular use.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A work machine comprising:
   a chassis;
   a ground-engaging drive mechanism;
   an operator station comprising:
     an operator standing platform; and
     one or more hand controls for propelling the work machine;
   a linkage connected to the operator station and the chassis; and
   a suspension element connected to the linkage, the suspension element being in contact with at least a portion of the linkage and positioned between the portion of the linkage and a fastener connected to the chassis.

2. The work machine as set forth in claim 1 further comprising a work tool connected to the work machine, the work tool being at least partially supported by the chassis.

3. The work machine as set forth in claim 2, wherein the work machine is a loader apparatus, the loader apparatus having a loader that supports the work tool.

4. The work machine as set forth in claim 1, wherein the suspension element comprises an airbag.

5. The work machine as set forth in claim 1, wherein the linkage extends between a first end and a second end and comprises one or more rubber torsion elements disposed at each of the first end and the second end.

6. The work machine as set forth in claim 1 further comprising a rearmost drive element having a center, a center of the operator standing platform being rearward to the center of the rearmost drive element.

7. The work machine as set forth in claim 1 further comprising an additional linkage connected to the operator station and connected to the chassis.

8. The work machine as set forth claim 1, wherein the work machine defines a longitudinal axis, the chassis partially extending behind a front of the operator standing platform along the longitudinal axis to form a pocket in which an operator may at least be partially disposed.

9. The work machine as set forth in claim 1 further comprising a suspension system connecting the operator station to the chassis, the suspension system including the linkage and the suspension element, wherein the work machine further comprises a suspension adjustment assembly for adjusting a preload of the suspension system.

10. The work machine as set forth in claim 1, wherein suspension element flexes to dissipate vibrational energy in the linkage.

11. The work machine as set forth in claim 1, wherein the operator station comprises a hip-thigh pad that moves with the operator station during suspended movement of the operator station, the hip-thigh pad being connected to a side member of the operator station.

12. The work machine as set forth in claim 1, wherein the linkage is connected to the operator station at a position below the operator standing platform.

13. A work machine comprising:
a chassis;
a loader supported by the chassis;
an interchangeable work tool connected to the loader;
a ground-engaging drive mechanism;
an operator station comprising:
an operator standing platform; and a control station comprising:
a control station panel; and
one or more hand controls disposed on the control station panel for propelling the machine; and
a linkage connected to the operator station and the chassis; and
a suspension element connected to the linkage, the suspension element being in contact with at least a portion of the linkage and positioned between the portion of the linkage and a fastener connected to the chassis.

14. The work machine as set forth in claim 13, wherein the suspension element comprises an airbag.

15. The work machine as set forth in claim 13, wherein the linkage extends between a first end and a second end and comprises one or more rubber torsion elements disposed at each of the first end and the second end.

16. The work machine as set forth in claim 13 further comprising a rearmost drive element having a center, a center of the operator standing platform being rearward to the center of the rearmost drive element.

17. The work machine as set forth in claim 13 further comprising an additional linkage connected to the operator station and connected to the chassis.

18. The work machine as set forth in claim 13, wherein the work machine defines a longitudinal axis, the chassis partially extending behind a front of the operator standing platform along the longitudinal axis, wherein the portion of the chassis that extends behind a front of the operator standing platform includes first and second extension members, the first and second extension members and the operator standing platform forming a pocket in which an operator may at least be partially disposed during operation of the work machine.

19. The work machine as set forth in claim 13 further comprising a suspension system connecting the operator station to the chassis, the suspension system including the linkage and the suspension element, wherein the work machine further comprises a suspension adjustment assembly for adjusting a preload of the suspension system.

\* \* \* \* \*